(12) United States Patent
Zhang et al.

(10) Patent No.: US 10,567,121 B2
(45) Date of Patent: Feb. 18, 2020

(54) LOW LATENCY SERVICE FEEDBACK METHOD AND COMMUNICATIONS DEVICE

(71) Applicant: Huawei Technologies Co., Ltd., Shenzhen (CN)

(72) Inventors: Xu Zhang, Beijing (CN); Lixia Xue, Beijing (CN); Yan Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/977,685

(22) Filed: May 11, 2018

(65) Prior Publication Data

US 2018/0262305 A1 Sep. 13, 2018

Related U.S. Application Data

(63) Continuation of application No. PCT/CN2015/094442, filed on Nov. 12, 2015.

(51) Int. Cl.
*H04L 1/18* (2006.01)
*H04L 5/00* (2006.01)
*H04W 72/04* (2009.01)

(52) U.S. Cl.
CPC .......... *H04L 1/1861* (2013.01); *H04L 1/1812* (2013.01); *H04L 1/1854* (2013.01); *H04L 5/0053* (2013.01); *H04W 72/0406* (2013.01); *H04L 5/0005* (2013.01)

(58) Field of Classification Search
CPC ... H04L 1/1861; H04L 1/1812; H04L 1/1854; H04L 5/0044; H04L 5/0053; H04L 5/0055; H04L 5/0091; H04L 5/1469; H04L 5/0005; H04W 72/0406
See application file for complete search history.

(56) References Cited

U.S. PATENT DOCUMENTS

| 2014/0153528 | A1 | 6/2014 | Chen et al. | |
| 2014/0241318 | A1* | 8/2014 | Zhong | H04W 74/0833 370/331 |
| 2015/0055519 | A1 | 2/2015 | Lin et al. | |
| 2015/0082418 | A1 | 3/2015 | Gu | |

(Continued)

FOREIGN PATENT DOCUMENTS

| CN | 101778455 A | 7/2010 |
| CN | 102511189 A | 6/2012 |

(Continued)

OTHER PUBLICATIONS

Levanen et al. "Radio Interface Evolution Towards 5G and Enhanced Local Area Communications," IEEE Access, dated Jun. 27, 2014, XP011559830, 25 pages.

(Continued)

*Primary Examiner* — Ian N Moore
*Assistant Examiner* — Brian T Le
(74) *Attorney, Agent, or Firm* — Slater Matsil, LLP

(57) ABSTRACT

An embodiment method includes: receiving, by a first communications device, a first service sent by a second communications device on a first time-frequency resource in a first subframe; and sending, by the first communications device at a preset feedback subframe location, first feedback information corresponding to the first service.

20 Claims, 14 Drawing Sheets

(56) References Cited

U.S. PATENT DOCUMENTS

2015/0117271 A1   4/2015   Liang et al.
2015/0296490 A1  10/2015   Yi et al.
2016/0261391 A1*  9/2016   Chen .................... H04L 5/0048

FOREIGN PATENT DOCUMENTS

| | | |
|---|---|---|
| CN | 102938690 A | 2/2013 |
| CN | 103036657 A | 4/2013 |
| CN | 103312470 A | 9/2013 |
| CN | 103368709 A | 10/2013 |
| CN | 103379010 A | 10/2013 |
| WO | 2015104055 A1 | 7/2015 |
| WO | 2016014155 A1 | 1/2016 |
| WO | 2017014560 A1 | 1/2017 |
| WO | 2017065830 A1 | 4/2017 |

OTHER PUBLICATIONS

Levanen et al., "Dense Small-Cell Networks: Rethinking the Radio Interface Beyond LTE-Advanced," 2014 1st International Conference on 5G for Ubiquitous Connectivity (5GU), XP032735039, 7 pages.

3GPP TS 36.213 V12.7.0, 3rd Generation Partnership Project; Technical Specification Group Radio Access Network; Evolved Universal Terrestrial Radio Access (E-UTRA); Physical layer procedures (Release 12), Sep. 2015, pp. 166-219.

Ericsson, "NX PHY Design" and "Frame Strucfture" in "5G Key Component of the Networked Society," RWS-150009, https://www.3gpp.org/ftp/workshop/2015-09-17_18_RAN_5G/Docs/RWS-150009.zip; 3GPP RAN Workshop on 5G, Phoenix AZ, USA, Sep. 17-18, 2015, 4 pages.

Intel Corporation, "HARQ aspect for TDD eIMTA", Agenda Item: 7.2.3.3, Document for discussion and decision R1-132927; http://www.3gpp.org/ftp/tsg_ran/WG1_RL1/TSGR1_74/Docs/R1-132927.zip; 3GPP TSG-RAN WG1 #74, Aug. 19-23, 2013, 4 pages.

Huawei, HiSilicon, "Discussion on frame structure for NR," R1-164032; http://www.3gpp.org/ftp/tsg_ran/WG1_RL1/TSGR1_156/Docs/R1-164032.zip; 3GPP TSG RAN WG1 Meeting 85, May 23-27, 2016, 8 pages.

* cited by examiner

LOW LATENCY SERVICE FEEDBACK METHOD AND COMMUNICATIONS DEVICE

CROSS-REFERENCE TO RELATED APPLICATIONS

This application is a continuation of International Application No. PCT/CN2015/094442, filed on Nov. 12, 2015, the disclosure of which is hereby incorporated by reference in its entirety.

TECHNICAL FIELD

The present invention relates to communications technologies, and in particular, to a service feedback method and a communications device.

BACKGROUND

In an existing Long Term Evolution (LTE) system, a base station schedules a wireless device by using a Time Division Duplex (TDD) system, to share all spectrum resources. In an existing TDD system, transmission reliability of a physical layer is improved by using a hybrid automatic repeat request (HARQ) mechanism, and a transmission time sequence of a HARQ in a time dimension is referred to as HARQ timing. In a schematic diagram of downlink HARQ timing (D indicates a downlink subframe, S indicates a special subframe, and U indicates an uplink subframe) shown in FIG. 1, a base station in a TDD system transmits downlink data for user equipment (UE) in a downlink transmission subframe 0. The UE receives the downlink data in the subframe 0. Then, the UE processes the downlink data within a fixed period of data processing time (the processing time occupies at least four subframes), and sends feedback information to a base station in an uplink subframe 7. The feedback information may be acknowledgement (ACK) information or negative acknowledgement (NACK) information. The base station determines, according to the feedback information, whether to schedule retransmission of a data packet and sending of a new data packet for the UE. If the base station sends the downlink data in a downlink subframe 3 and the UE also sends the feedback information in the subframe 7, the data processing time of the UE occupies four subframes. Therefore, downlink HARQ timing in FIG. 1 may be understood as indicating, to the UE, a location of a subframe in which the feedback information is sent.

For another example, referring to a schematic diagram of uplink HARQ timing shown in FIG. 2, if the UE receives uplink scheduling information (UL grant) sent by the base station in the downlink subframe 3, and the UE transmits uplink data on an uplink time-frequency resource (the uplink subframe 7) specified by the uplink scheduling information. After receiving the transmitted uplink data, the base station transmits feedback information to the UE at a nearest downlink transmission resource location (that is, a special subframe 1 of a next radio frame) following the four subframes. Therefore, uplink HARQ timing in FIG. 2 may be understood as indicating, to the base station, a location of a subframe in which the feedback information is sent. That is, HARQ timing in both uplink HARQ timing and downlink HARQ timing indicates, to a data receiving device, a location of a subframe for sending the feedback information, so that the data receiving device may send the feedback information to a data sending device in time.

However, in a current service feedback method, a period from sending service data to feedback is excessively long, and a low latency requirement of a low-latency service cannot be met.

SUMMARY

Embodiments of the present invention provides a service feedback method and a communications device, to resolve a technical problem that a period from sending service data to receiving feedback is excessively long and a low latency requirement of a low-latency service cannot be met in a current service feedback method.

According to a first aspect, embodiments of the present invention provide a service feedback method. The method includes receiving, by a first communications device, a first service sent by a second communications device on a first time-frequency resource in a first subframe. The first time-frequency resource includes at least one of a physical control channel resource in the first subframe, a physical shared channel resource in the first subframe, or a feedback resource. The method further includes sending, by the first communications device at a preset feedback subframe location, first feedback information corresponding to the first service. An interval between a subframe location corresponding to the first time-frequency resource in the first subframe and the feedback subframe location is first timing. An interval between a subframe location corresponding to a second time-frequency resource used by the second communications device to send a second service and a subframe location corresponding to a third time-frequency resource used by the first communications device to send second feedback information to the second communications device is second timing. The first timing is less than the second timing.

According to the service feedback method provided in the first aspect, the second communications device sends the first service to the first communications device on the first time-frequency resource, so that the first communications device has sufficient time to process the first service after receiving the first service. The time-frequency resource in the first subframe is re-allocated and the first communications device may send the first feedback information to the second communications device at the preset feedback subframe location, so as to ensure that a latency (e.g., the first timing) between sending the first service and receiving the first feedback information corresponding to the first service is less than a latency (e.g., the second timing) between sending the second service and receiving the second feedback information corresponding to the second service, that is, less than a feedback latency of a conventional service. Therefore, according to the service feedback method provided in the embodiments of the present invention, a period from sending data to feedback of a low-latency service is shortened and a low latency requirement of the low-latency service is met.

In a first possible implementation of the first aspect, before the sending, by the first communications device at a preset feedback subframe location, first feedback information corresponding to the first service, the method further includes determining, by the first communications device, the feedback subframe location according to a type of the first service, a size of the first service, and a first mapping relationship, where the first mapping relationship includes a correspondence between the first time-frequency resource and the first timing.

In a second possible implementation of the first aspect, before the sending, by the first communications device at a preset feedback subframe location, first feedback information corresponding to the first service, the method further includes receiving, by the first communications device, the feedback subframe location that is determined by the second communications device according to a type of the first service, a size of the first service, and a first mapping relationship, where the first mapping relationship includes a correspondence between the first time-frequency resource and the first timing.

Optionally, in a third possible implementation of the first aspect, the first communications device is user equipment UE, and the second communications device is a base station. The first time-frequency resource is a physical downlink control channel resource in the first subframe, and the second time-frequency resource is a physical downlink shared channel resource in the first subframe. Alternatively, the first time-frequency resource is a part of a physical downlink shared channel resource, and the second time-frequency resource is a remaining part of the physical downlink shared channel resource. Alternatively, the first time-frequency resource is a part of a physical downlink control channel resource and a part of a physical downlink shared channel resource, and the second time-frequency resource is a remaining part of the physical downlink shared channel resource. The method further includes before the receiving, by a first communications device, a first service sent by a second communications device on a first time-frequency resource in a first subframe receiving, by the first communications device, first indication information sent by the second communications device, where the first indication information is used to indicate to the first communications device that the first subframe includes the first service. In this possible implementation, the feedback subframe location is a subframe, in a radio frame, that has an uplink transmission resource and that is closest to the first subframe and that can transmit feedback information.

According to the method provided in the third possible implementation, after the second communications device sends the first service on the first time-frequency resource, the first communications device may send the first feedback information on the subframe, in the radio frame, that has an uplink transmission resource and that is closest to the first subframe and that can transmit feedback information, so that the first timing is less than the second timing, and a feedback latency of the first service is greatly shortened.

Optionally, in a fourth possible implementation of the first aspect, the first communications device is user equipment UE, the second communications device is a base station, and the first subframe is a type-1 subframe. Before the receiving, by a first communications device, a first service sent by a second communications device on a first time-frequency resource in a first subframe, the method further includes receiving, by the first communications device, second indication information sent by the second communications device, where the second indication information is used to indicate to the first communications device that the first subframe includes the first service, and to instruct the first communications device to receive the first service on a part of the physical downlink shared channel resource. In the fourth possible implementation, the feedback subframe location is a location, in the first subframe, of a time-frequency resource used to transmit feedback information.

According to the method provided in the fourth possible implementation, after receiving the first service, the UE may send the first feedback information to the base station by using the uplink transmission resource of the current first subframe before the current first subframe ends, and does not need to send the first feedback information in another subframe. Therefore, time used by the UE to feed back to the first service of the base station is greatly reduced, and a feedback latency of the first service is shortened.

Optionally, in a fifth possible implementation of the first aspect, the first communications device is user equipment UE, the second communications device is a base station, the first subframe is a type-2 subframe, and the first time-frequency resource is a time-frequency resource that is in the first subframe and used to transmit feedback information. Before the receiving, by a first communications device, a first service sent by a second communications device on a first time-frequency resource in a first subframe, the method further includes receiving, by the first communications device, third indication information sent by the second communications device, where the third indication information is used to indicate to the first communications device that the first subframe includes the first service, and to instruct the first communications device to receive the first service on the time-frequency resource that is in the first subframe and used to transmit feedback information. In the fifth possible implementation, the feedback subframe location is a location, in the first subframe, of a physical uplink shared channel resource.

According to the method provided in the fifth possible implementation, after receiving the first service, the UE may send the first feedback information to the base station by using the uplink transmission resource of the current first subframe before the current first subframe ends, and does not need to send the first feedback information in another subframe. Therefore, time used by the UE to feed back to the first service of the base station is greatly reduced, and a feedback latency of the first service is shortened.

Optionally, in a sixth possible implementation of the first aspect, the first communications device is a base station, and the second communications device is user equipment UE; the first time-frequency resource is a physical uplink control channel resource in the first subframe, and the second time-frequency resource is a physical uplink shared channel resource in the first subframe; or the first time-frequency resource is a part of a physical uplink shared channel resource, and the second time-frequency resource is a remaining part of the physical uplink shared channel resource; or the first time-frequency resource is a part of a physical uplink control channel resource and a part of a physical uplink shared channel resource, and the second time-frequency resource is a remaining part of the physical uplink shared channel resource. Before the receiving, by a first communications device, a first service sent by a second communications device on a first time-frequency resource in a first subframe, the method further includes: sending, by the first communications device, fourth indication information to the second communications device, where the fourth indication information is used to instruct the second communications device to send the first service on the first time-frequency resource in the first subframe. In the sixth possible implementation, the feedback subframe location is a subframe that has a downlink transmission resource and that is closest to the first subframe and that can transmit feedback information.

According to the method provided in the sixth possible implementation, after the second communications device sends the first service on the first time-frequency resource, the first communications device may send the first feedback information on the subframe, in a radio frame, that has a downlink transmission resource and that is closest to the first subframe and that can transmit feedback information, that is, the time-frequency resource in the first subframe is re-allocated. A feedback latency of the first service is greatly shortened.

Optionally, in a seventh possible implementation of the first aspect, the first communications device is a base station, the second communications device is user equipment UE, and the first subframe is a type-1 subframe; before the receiving, by a first communications device, a first service sent by a second communications device on a first time-frequency resource in a first subframe, the method further includes: sending, by the first communications device, fifth indication information to the second communications device, where the fifth indication information is used to indicate to the second communications device that the first time-frequency resource is a time-frequency resource that is in the first subframe and used to transmit feedback information.

Optionally, in an eighth possible implementation of the first aspect, the first communications device is a base station, the second communications device is user equipment UE, and the first subframe is a type-2 subframe. before the receiving, by a first communications device, a first service sent by a second communications device on a first time-frequency resource in a first subframe, the method further includes sending, by the first communications device, sixth indication information to the second communications device, where the sixth indication information is used to indicate to the second communications device that the first time-frequency resource is a part of the physical uplink shared channel resource in the first subframe. In the seventh or eighth possible implementation, the feedback subframe location is a next-next subframe of the first subframe.

According to the method provided in the seventh possible implementation, the UE may transmit uplink data by using an uplink transmission resource at a tail of the current first subframe, and does not need to wait for one uplink subframe to transmit the uplink data. In this way, the base station may complete sending the first feedback information in a next-next subframe of the first subframe, and does not need to send the feedback information after waiting for at least four subframes in a same manner as a conventional service (that is, the second service). Therefore, according to this implementation, a resource reuse location of the first service is defined to greatly reduce time used by the UE to feed back to the first service of the base station, so that a feedback latency of the first service is shortened, and low-latency user data transmission is implemented.

Optionally, in a ninth possible implementation of the first aspect, the first communications device is a base station, the second communications device is user equipment UE, and the first subframe is a type-2 subframe. Before the receiving, by a first communications device, a first service sent by a second communications device on a first time-frequency resource in a first subframe, the method further includes sending, by the first communications device, seventh indication information to the second communications device in a previous subframe of the first subframe, where the seventh indication information is used to indicate to the second communications device that the first time-frequency resource is a part of the physical uplink shared channel resource in the first subframe. In the ninth possible implementation, the feedback subframe location is a next subframe of the first subframe.

According to the method provided in the ninth possible implementation, reusing an UL resource of the physical uplink shared channel resource in the first subframe greatly reduces time used by the UE to feed back to the first service of the base station and shortens a feedback latency of the first service.

According to a second aspect, embodiments the present invention provide a service feedback method. The method includes sending, by a second communications device, a first service to a first communications device on a first time-frequency resource in a first subframe. The first time-frequency resource includes at least one of a physical control channel resource in the first subframe, a physical shared channel resource in the first subframe, or a feedback resource. The method includes receiving, by the second communications device, first feedback information that corresponds to the first service and is sent by the first communications device at a preset feedback subframe location. An interval between a subframe location corresponding to the first time-frequency resource in the first subframe and the feedback subframe location is first timing, an interval between a subframe location corresponding to a second time-frequency resource used by the second communications device to send a second service and a subframe location corresponding to a third time-frequency resource used by the first communications device to send second feedback information to the second communications device is second timing, and the first timing is less than the second timing.

In a first possible implementation of the second aspect, before the receiving, by the second communications device, first feedback information that corresponds to the first service and is sent by the first communications device at a preset feedback subframe location. The method further includes determining, by the second communications device, the feedback subframe location according to a type of the first service, a size of the first service, and a first mapping relationship, where the first mapping relationship includes a correspondence between the first time-frequency resource and the first timing. The method further includes sending, by the second communications device, the feedback subframe location to the first communications device, to instruct the first communications device to send the first feedback information at the feedback subframe location.

In a second possible implementation of the second aspect, the first communications device is user equipment UE, and the second communications device is a base station; the first time-frequency resource is a physical downlink control channel resource in the first subframe, and the second time-frequency resource is a physical downlink shared channel resource in the first subframe; or the first time-frequency resource is a part of a physical downlink shared channel resource, and the second time-frequency resource is a remaining part of the physical downlink shared channel resource; or the first time-frequency resource is a part of a physical downlink control channel resource and a part of a physical downlink shared channel resource, and the second time-frequency resource is a remaining part of the physical downlink shared channel resource. Before the sending, by a second communications device, a first service to a first communications device on a first time-frequency resource in a first subframe, the method further includes: sending, by the second communications device, first indication information to the first communications device, where the first indication information is used to indicate to the first communications device that the first subframe includes the first service. In the second possible implementation, the feedback subframe location is a subframe, in a radio frame, that has an uplink transmission resource and that is closest to the first subframe and that can transmit feedback information.

In a third possible implementation of the second aspect, the first communications device is user equipment UE, the second communications device is a base station, and the first subframe is a type-1 subframe; before the sending, by a second communications device, a first service to a first communications device on a first time-frequency resource in a first subframe, the method further includes: sending, by the second communications device, second indication information to the first communications device, where the second indication information is used to indicate to the first communications device that the first subframe includes the first service, and to instruct the first communications device to receive the first service on a part of the physical downlink shared channel resource. In the third possible implementation, the feedback subframe location is a location, in the first subframe, of a time-frequency resource used to transmit feedback information.

In a fourth possible implementation of the second aspect, the first communications device is user equipment UE, the second communications device is a base station, the first subframe is a type-2 subframe, and the first time-frequency resource is a time-frequency resource that is in the first subframe and used to transmit feedback information; before the sending, by a second communications device, a first service to a first communications device on a first time-frequency resource in a first subframe, the method further includes: sending, by the second communications device, third indication information to the first communications device, where the third indication information is used to indicate to the first communications device that the first subframe includes the first service, and to instruct the first communications device to receive the first service on the time-frequency resource that is in the first subframe and used to transmit feedback information. In the fourth possible implementation, the feedback subframe location is a location, in the first subframe, of a physical uplink shared channel resource.

In a fifth possible implementation of the second aspect, the first communications device is a base station, and the second communications device is user equipment UE; the first time-frequency resource is a physical uplink control channel resource in the first subframe, and the second time-frequency resource is a physical uplink shared channel resource in the first subframe; or the first time-frequency resource is a part of a physical uplink shared channel resource, and the second time-frequency resource is a remaining part of the physical uplink shared channel resource; or the first time-frequency resource is a part of a physical uplink control channel resource and a part of a physical uplink shared channel resource, and the second time-frequency resource is a remaining part of the physical uplink shared channel resource. Before the sending, by a second communications device, a first service to a first communications device on a first time-frequency resource in a first subframe, the method further includes: receiving, by the second communications device, fourth indication information sent by the first communications device, where the fourth indication information is used to instruct the second communications device to send the first service on the first time-frequency resource in the first subframe. In the fifth possible implementation, the feedback subframe location is a subframe that has a downlink transmission resource and that is closest to the first subframe and that can transmit feedback information.

In a sixth possible implementation of the second aspect, the first communications device is a base station, the second communications device is user equipment UE, and the first subframe is a type-1 subframe; before the sending, by a second communications device, a first service to a first communications device on a first time-frequency resource in a first subframe, the method further includes: receiving, by the second communications device, fifth indication information sent by the first communications device, where the fifth indication information is used to indicate to the second communications device that the first time-frequency resource is a time-frequency resource that is in the first subframe and used to transmit feedback information.

In a seventh possible implementation of the second aspect, the first communications device is a base station, the second communications device is user equipment UE, and the first subframe is a type-2 subframe; before the sending, by a second communications device, a first service to a first communications device on a first time-frequency resource in a first subframe, the method further includes: receiving, by the second communications device, sixth indication information sent by the first communications device, where the sixth indication information is used to indicate to the second communications device that the first time-frequency resource is a part of the physical uplink shared channel resource in the first subframe. In the sixth or seventh possible implementation, the feedback subframe location is a next-next subframe of the first subframe.

In an eighth possible implementation of the second aspect, the first communications device is a base station, the second communications device is user equipment UE, and the first subframe is a type-2 subframe; before the sending, by a second communications device, a first service to a first communications device on a first time-frequency resource in a first subframe, the method further includes: receiving, by the second communications device, seventh indication information sent by the first communications device in a previous subframe of the first subframe, where the seventh indication information is used to indicate to the second communications device that the first time-frequency resource is a part of the physical uplink shared channel resource in the first subframe. In the eighth possible implementation, the feedback subframe location is a next subframe of the first subframe.

For advantageous effects brought by the second aspect and the possible implementations of the second aspect, refer to the advantageous effects brought by the first aspect and the possible implementations of the first aspect, and details are not described herein again.

According to a third aspect, embodiments of the present invention provide a communications device. The communication device includes a receiving module, configured to receive a first service sent by a second communications device on a first time-frequency resource in a first subframe. The first time-frequency resource includes at least one of a physical control channel resource in the first subframe, a physical shared channel resource in the first subframe, or a feedback resource. The communications device includes a sending module, configured to send, at a preset feedback subframe location, first feedback information corresponding to the first service. An interval between a subframe location corresponding to the first time-frequency resource in the first subframe and the feedback subframe location is first timing, an interval between a subframe location corresponding to a second time-frequency resource used by the second communications device to send a second service and a subframe location corresponding to a third time-frequency resource used by the communications device to send second feedback information to the second communications device is second timing, and the first timing is less than the second timing.

In a first possible implementation of the third aspect, the communications device further includes a processing module, configured to: before the sending module sends, at the preset feedback subframe location, the first feedback information corresponding to the first service, determine the feedback subframe location according to a type of the first service, a size of the first service, and a first mapping relationship, where the first mapping relationship includes a correspondence between the first time-frequency resource and the first timing.

In a second possible implementation of the third aspect, the receiving module is further configured to: before the sending module sends, at the preset feedback subframe location, the first feedback information corresponding to the first service, receive the feedback subframe location that is determined by the second communications device according to a type of the first service, a size of the first service, and a first mapping relationship, where the first mapping relationship includes a correspondence between the first time-frequency resource and the first timing.

In a third possible implementation of the third aspect, the communications device is user equipment UE, and the second communications device is a base station; the first time-frequency resource is a physical downlink control channel resource in the first subframe, and the second time-frequency resource is a physical downlink shared channel resource in the first subframe; or the first time-frequency resource is a part of a physical downlink shared channel resource, and the second time-frequency resource is a remaining part of the physical downlink shared channel resource; or the first time-frequency resource is a part of a physical downlink control channel resource and a part of a physical downlink shared channel resource, and the second time-frequency resource is a remaining part of the physical downlink shared channel resource. The receiving module is further configured to: before receiving the first service sent by the second communications device on the first time-frequency resource in the first subframe, receive first indication information sent by the second communications device, where the first indication information is used to indicate to the communications device that the first subframe includes the first service. In the third possible implementation, the feedback subframe location is a subframe, in a radio frame, that has an uplink transmission resource and that is closest to the first subframe and that can transmit feedback information.

In a fourth possible implementation of the third aspect, the communications device is user equipment UE, the second communications device is a base station, and the first subframe is a type-1 subframe; the receiving module is further configured to: before receiving the first service sent by the second communications device on the first time-frequency resource in the first subframe, receive second indication information sent by the second communications device, where the second indication information is used to indicate to the communications device that the first subframe includes the first service, and to instruct the communications device to receive the first service on a part of the physical downlink shared channel resource. In the fourth possible implementation, the feedback subframe location is a location, in the first subframe, of a time-frequency resource used to transmit feedback information.

In a fifth possible implementation of the third aspect, the communications device is user equipment UE, the second communications device is a base station, the first subframe is a type-2 subframe, and the first time-frequency resource is a time-frequency resource that is in the first subframe and used to transmit feedback information; the receiving module is further configured to: before receiving the first service sent by the second communications device on the first time-frequency resource in the first subframe, receive third indication information sent by the second communications device, where the third indication information is used to indicate to the communications device that the first subframe includes the first service, and to instruct the communications device to receive the first service on the time-frequency resource that is in the first subframe and used to transmit feedback information. In the fifth possible implementation, the feedback subframe location is a location, in the first subframe, of a physical uplink shared channel resource.

In a sixth possible implementation of the third aspect, the communications device is a base station, and the second communications device is user equipment UE; the first time-frequency resource is a physical uplink control channel resource in the first subframe, and the second time-frequency resource is a physical uplink shared channel resource in the first subframe; or the first time-frequency resource is a part of a physical uplink shared channel resource, and the second time-frequency resource is a remaining part of the physical uplink shared channel resource; or the first time-frequency resource is a part of a physical uplink control channel resource and a part of a physical uplink shared channel resource, and the second time-frequency resource is a remaining part of the physical uplink shared channel resource. The sending module is further configured to: before the receiving module receives the first service sent by the second communications device on the first time-frequency resource in the first subframe, send fourth indication information to the second communications device, where the fourth indication information is used to instruct the second communications device to send the first service on the first time-frequency resource in the first subframe. In the sixth possible implementation, the feedback subframe location is a subframe that has a downlink transmission resource and that is closest to the first subframe and that can transmit feedback information.

In a seventh possible implementation of the third aspect, the communications device is a base station, and the second communications device is user equipment UE, and the first subframe is a type-1 subframe; the sending module is further configured to: before the receiving module receives the first service sent by the second communications device on the first time-frequency resource in the first subframe, send fifth indication information to the second communications device, where the fifth indication information is used to indicate to the second communications device that the first time-frequency resource is a time-frequency resource that is in the first subframe and used to transmit feedback information.

In an eight possible implementation of the third aspect, the communications device is a base station, and the second communications device is user equipment UE, and the first subframe is a type-2 subframe; the sending module is further configured to: before the receiving module receives the first service sent by the second communications device on the first time-frequency resource in the first subframe, send sixth indication information to the second communications device, where the sixth indication information is used to indicate to the second communications device that the first time-frequency resource is a part of the physical uplink shared channel resource in the first subframe.

In the seventh or eighth possible implementation, the feedback subframe location is a next-next subframe of the first subframe.

In a ninth possible implementation of the third aspect, the communications device is a base station, and the second communications device is user equipment UE, and the first subframe is a type-2 subframe; the sending module is further configured to: before the receiving module receives the first service sent by the second communications device on the first time-frequency resource in the first subframe, send seventh indication information to the second communications device in a previous subframe of the first subframe, where the seventh indication information is used to indicate to the second communications device that the first time-frequency resource is a part of the physical uplink shared channel resource in the first subframe. In the ninth possible implementation, the feedback subframe location is a next subframe of the first subframe.

For advantageous effects brought by the third aspect and the possible implementations of the third aspect, refer to the advantageous effects brought by the first aspect and the possible implementations of the first aspect, and details are not described herein again.

According to a fourth aspect, embodiments of the present invention provide a communications device. The communications device includes a sending module, configured to send a first service to a first communications device on a first time-frequency resource in a first subframe. The first time-frequency resource includes at least one of a physical control channel resource in the first subframe, a physical shared channel resource in the first subframe, or a feedback resource. The communications device further includes a receiving module, configured to receive first feedback information that corresponds to the first service and is sent by the first communications device at a preset feedback subframe location. An interval between a subframe location corresponding to the first time-frequency resource in the first subframe and the feedback subframe location is first timing, an interval between a subframe location corresponding to a second time-frequency resource used by the communications device to send a second service and a subframe location corresponding to a third time-frequency resource used by the first communications device to send second feedback information to the communications device is second timing, and the first timing is less than the second timing.

In a first possible implementation of the fourth aspect, the communications device further includes a processing module, configured to: before the receiving module receives the first feedback information that corresponds to the first service and is sent by the first communications device at the preset feedback subframe location, determine the feedback subframe location according to a type of the first service, a size of the first service, and a first mapping relationship, where the first mapping relationship includes a correspondence between the first time-frequency resource and the first timing. The sending module is configured to send the feedback subframe location to the first communications device, to instruct the first communications device to send the first feedback information at the feedback subframe location.

In a second possible implementation of the fourth aspect, the first communications device is user equipment UE, and the communications device is a base station; the first time-frequency resource is a physical downlink control channel resource in the first subframe, and the second time-frequency resource is a physical downlink shared channel resource in the first subframe; or the first time-frequency resource is a part of a physical downlink shared channel resource, and the second time-frequency resource is a remaining part of the physical downlink shared channel resource; or the first time-frequency resource is a part of a physical downlink control channel resource and a part of a physical downlink shared channel resource, and the second time-frequency resource is a remaining part of the physical downlink shared channel resource. The sending module is further configured to: before sending the first service to the first communications device on the first time-frequency resource in the first subframe, send first indication information to the first communications device, where the first indication information is used to indicate to the first communications device that the first subframe includes the first service. In the second possible implementation, the feedback subframe location is a subframe, in a radio frame, that has an uplink transmission resource and that is closest to the first subframe and that can transmit feedback information.

In a third possible implementation of the fourth aspect, the first communications device is user equipment UE, the communications device is a base station, and the first subframe is a type-1 subframe; the sending module is further configured to: before sending the first service to the first communications device on the first time-frequency resource in the first subframe, send second indication information to the first communications device, where the second indication information is used to indicate to the first communications device that the first subframe includes the first service, and to instruct the first communications device to receive the first service on a part of the physical downlink shared channel resource. In the third possible implementation, the feedback subframe location is a location, in the first subframe, of a time-frequency resource used to transmit feedback information.

In a fourth possible implementation of the fourth aspect, the first communications device is user equipment UE, the communications device is a base station, the first subframe is a type-2 subframe, and the first time-frequency resource is a time-frequency resource that is in the first subframe and used to transmit feedback information; the sending module is further configured to: before sending the first service to the first communications device on the first time-frequency resource in the first subframe, send third indication information to the first communications device, where the third indication information is used to indicate to the first communications device that the first subframe includes the first service, and to instruct the first communications device to receive the first service on the time-frequency resource that is in the first subframe and used to transmit feedback information. In the fourth possible implementation, the feedback subframe location is a location, in the first subframe, of a physical uplink shared channel resource In a fifth possible implementation of the fourth aspect, the first communications device is a base station, and the communications device is user equipment UE; the first time-frequency resource is a physical uplink control channel resource in the first subframe, and the second time-frequency resource is a physical uplink shared channel resource in the first subframe; or the first time-frequency resource is a part of a physical uplink shared channel resource, and the second time-frequency resource is a remaining part of the physical uplink shared channel resource; or the first time-frequency resource is a part of a physical uplink control channel resource and a part of a physical uplink shared channel resource, and the second time-frequency resource is a remaining part of the physical uplink shared channel resource. The receiving module is further configured to: before the sending module sends the first service to the first communications device on the first time-frequency resource in the first subframe, receive fourth indication information sent by the first communications device, where the fourth indication information is used to instruct the communications device to send the first service on the first time-frequency resource in the first subframe. In the fifth possible implementation, the feedback subframe location is a subframe that has a downlink transmission resource and that is closest to the first subframe and that can transmit feedback information.

In a sixth possible implementation of the fourth aspect, the first communications device is a base station, the communications device is user equipment UE, and the first subframe is a type-1 subframe. The receiving module is further configured to: before the sending module sends the first service to the first communications device on the first time-frequency resource in the first subframe, receive fifth indication information sent by the first communications device, where the fifth indication information is used to indicate to the communications device that the first time-frequency resource is a time-frequency resource that is in the first subframe and used to transmit feedback information.

In a seventh possible implementation of the fourth aspect, the first communications device is a base station, the communications device is user equipment UE, and the first subframe is a type-2 subframe. The receiving module is further configured to: before the sending module sends the first service to the first communications device on the first time-frequency resource in the first subframe, receive sixth indication information sent by the first communications device, where the sixth indication information is used to indicate to the communications device that the first time-frequency resource is a part of the physical uplink shared channel resource in the first subframe.

In the sixth or seventh possible implementation, the feedback subframe location is a next-next subframe of the first subframe.

In an eighth possible implementation of the fourth aspect, the first communications device is a base station, the communications device is user equipment UE, and the first subframe is a type-2 subframe. The receiving module is further configured to: before the sending module sends the first service to the first communications device on the first time-frequency resource in the first subframe, receive seventh indication information sent by the first communications device in a previous subframe of the first subframe, where the seventh indication information is used to indicate to the communications device that the first time-frequency resource is a part of the physical uplink shared channel resource in the first subframe. In the eighth possible implementation, the feedback subframe location is a next subframe of the first subframe.

For advantageous effects brought by the fourth aspect and the possible implementations of the fourth aspect, refer to the advantageous effects brought by the first aspect and the possible implementations of the first aspect, and details are not described herein again.

According to a fifth aspect, embodiments of the present invention provide a communications device. A receiver, configured to receive a first service sent by a second communications device on a first time-frequency resource in a first subframe. The first time-frequency resource includes at least one of a physical control channel resource in the first subframe, a physical shared channel resource in the first subframe, or a feedback resource. The communications device further includes a transmitter, configured to send, at a preset feedback subframe location, first feedback information corresponding to the first service. An interval between a subframe location corresponding to the first time-frequency resource in the first subframe and the feedback subframe location is first timing, an interval between a subframe location corresponding to a second time-frequency resource used by the second communications device to send a second service and a subframe location corresponding to a third time-frequency resource used by the communications device to send second feedback information to the second communications device is second timing, and the first timing is less than the second timing.

In a first possible implementation of the fifth aspect, the communications device further includes a processor, configured to: before the transmitter sends, at the preset feedback subframe location, the first feedback information corresponding to the first service, determine the feedback subframe location according to a type of the first service, a size of the first service, and a first mapping relationship, where the first mapping relationship includes a correspondence between the first time-frequency resource and the first timing.

In a second possible implementation of the fifth aspect, the receiver is further configured to: before the transmitter sends, at the preset feedback subframe location, the first feedback information corresponding to the first service, receive the feedback subframe location that is determined by the second communications device according to a type of the first service, a size of the first service, and a first mapping relationship, where the first mapping relationship includes a correspondence between the first time-frequency resource and the first timing.

In a third possible implementation of the fifth aspect, the communications device is user equipment UE, and the second communications device is a base station; the first time-frequency resource is a physical downlink control channel resource in the first subframe, and the second time-frequency resource is a physical downlink shared channel resource in the first subframe; or the first time-frequency resource is a part of a physical downlink shared channel resource, and the second time-frequency resource is a remaining part of the physical downlink shared channel resource; or the first time-frequency resource is a part of a physical downlink control channel resource and a part of a physical downlink shared channel resource, and the second time-frequency resource is a remaining part of the physical downlink shared channel resource. The receiver is further configured to: before receiving the first service sent by the second communications device on the first time-frequency resource in the first subframe, receive first indication information sent by the second communications device, where the first indication information is used to indicate to the communications device that the first subframe includes the first service. In the third possible implementation, the feedback subframe location is a subframe, in a radio frame, that has an uplink transmission resource and that is closest to the first subframe and that can transmit feedback information.

In a fourth possible implementation of the fifth aspect, the communications device is user equipment UE, the second communications device is a base station, and the first subframe is a type-1 subframe; the receiver is further configured to: before receiving the first service sent by the second communications device on the first time-frequency resource in the first subframe, receive second indication information sent by the second communications device, where the second indication information is used to indicate to the communications device that the first subframe includes the first service, and to instruct the communications device to receive the first service on a part of the physical downlink shared channel resource. In the fourth possible implementation, the feedback subframe location is a location, in the first subframe, of a time-frequency resource used to transmit feedback information.

In a fifth possible implementation of the fifth aspect, the communications device is user equipment UE, the second communications device is a base station, the first subframe is a type-2 subframe, and the first time-frequency resource is a time-frequency resource that is in the first subframe and used to transmit feedback information; the receiver is further configured to: before receiving the first service sent by the second communications device on the first time-frequency resource in the first subframe, receive third indication information sent by the second communications device, where the third indication information is used to indicate to the communications device that the first subframe includes the first service, and to instruct the communications device to receive the first service on the time-frequency resource that is in the first subframe and used to transmit feedback information. In the fifth possible implementation, the feedback subframe location is a location, in the first subframe, of a physical uplink shared channel resource.

In a sixth possible implementation of the fifth aspect, the communications device is a base station, and the second communications device is user equipment UE; the first time-frequency resource is a physical uplink control channel resource in the first subframe, and the second time-frequency resource is a physical uplink shared channel resource in the first subframe; or the first time-frequency resource is a part of a physical uplink shared channel resource, and the second time-frequency resource is a remaining part of the physical uplink shared channel resource; or the first time-frequency resource is a part of a physical uplink control channel resource and a part of a physical uplink shared channel resource, and the second time-frequency resource is a remaining part of the physical uplink shared channel resource. The transmitter is further configured to: before the receiver receives the first service sent by the second communications device on the first time-frequency resource in the first subframe, send fourth indication information to the second communications device, where the fourth indication information is used to instruct the second communications device to send the first service on the first time-frequency resource in the first subframe. In the sixth possible implementation, the feedback subframe location is a subframe that has a downlink transmission resource and that is closest to the first subframe and that can transmit feedback information.

In a seventh possible implementation of the fifth aspect, the communications device is a base station, and the second communications device is user equipment UE, and the first subframe is a type-1 subframe; the transmitter is further configured to: before the receiver receives the first service sent by the second communications device on the first time-frequency resource in the first subframe, send fifth indication information to the second communications device, where the fifth indication information is used to indicate to the second communications device that the first time-frequency resource is a time-frequency resource that is in the first subframe and used to transmit feedback information.

In an eighth possible implementation of the fifth aspect, the communications device is a base station, and the second communications device is user equipment UE, and the first subframe is a type-2 subframe; the transmitter is further configured to: before the receiver receives the first service sent by the second communications device on the first time-frequency resource in the first subframe, send sixth indication information to the second communications device, where the sixth indication information is used to indicate to the second communications device that the first time-frequency resource is a part of the physical uplink shared channel resource in the first subframe.

In the seventh or eighth possible implementation, the feedback subframe location is a next-next subframe of the first subframe.

In a ninth possible implementation of the fifth aspect, the communications device is a base station, and the second communications device is user equipment UE, and the first subframe is a type-2 subframe; the transmitter is further configured to: before the receiver receives the first service sent by the second communications device on the first time-frequency resource in the first subframe, send seventh indication information to the second communications device in a previous subframe of the first subframe, where the seventh indication information is used to indicate to the second communications device that the first time-frequency resource is a part of the physical uplink shared channel resource in the first subframe. In the ninth possible implementation, the feedback subframe location is a next subframe of the first subframe.

For advantageous effects brought by the fifth aspect and the possible implementations of the fifth aspect, refer to the advantageous effects brought by the first aspect and the possible implementations of the first aspect, and details are not described herein again.

According to a sixth aspect, embodiments of the present invention provide a communications device. The communications device further includes a transmitter, configured to send a first service to a first communications device on a first time-frequency resource in a first subframe. The first time-frequency resource includes at least one of a physical control channel resource in the first subframe, a physical shared channel resource in the first subframe, or a feedback resource. The communications device further includes a receiver, configured to receive first feedback information that corresponds to the first service and is sent by the first communications device at a preset feedback subframe location. An interval between a subframe location corresponding to the first time-frequency resource in the first subframe and the feedback subframe location is first timing, an interval between a subframe location corresponding to a second time-frequency resource used by the communications device to send a second service and a subframe location corresponding to a third time-frequency resource used by the first communications device to send second feedback information to the communications device is second timing, and the first timing is less than the second timing.

In a first possible implementation of the sixth aspect, the communications device further includes a processor, configured to: before the receiver receives the first feedback information that corresponds to the first service and is sent by the first communications device at the preset feedback subframe location, determine the feedback subframe location according to a type of the first service, a size of the first service, and a first mapping relationship, where the first mapping relationship includes a correspondence between the first time-frequency resource and the first timing. The transmitter is configured to send the feedback subframe location to the first communications device, to instruct the first communications device to send the first feedback information at the feedback subframe location.

In a second possible implementation of the sixth aspect, the first communications device is user equipment UE, and the communications device is a base station; the first time-frequency resource is a physical downlink control channel resource in the first subframe, and the second time-frequency resource is a physical downlink shared channel resource in the first subframe; or the first time-frequency resource is a part of a physical downlink shared channel resource, and the second time-frequency resource is a remaining part of the physical downlink shared channel resource; or the first time-frequency resource is a part of a physical downlink control channel resource and a part of a physical downlink shared channel resource, and the second time-frequency resource is a remaining part of the physical downlink shared channel resource. The transmitter is further configured to: before sending the first service to the first communications device on the first time-frequency resource in the first subframe, send first indication information to the first communications device, where the first indication information is used to indicate to the first communications device that the first subframe includes the first service. In the second possible implementation, the feedback subframe location is a subframe, in a radio frame, that has an uplink transmission resource and that is closest to the first subframe and that can transmit feedback information.

In a third possible implementation of the sixth aspect, the first communications device is user equipment UE, the communications device is a base station, and the first subframe is a type-1 subframe; the transmitter is further configured to: before sending the first service to the first communications device on the first time-frequency resource in the first subframe, send second indication information to the first communications device, where the second indication information is used to indicate to the first communications device that the first subframe includes the first service, and to instruct the first communications device to receive the first service on a part of the physical downlink shared channel resource. In the third possible implementation, the feedback subframe location is a location, in the first subframe, of a time-frequency resource used to transmit feedback information.

In a fourth possible implementation of the sixth aspect, the first communications device is user equipment UE, the communications device is a base station, the first subframe is a type-2 subframe, and the first time-frequency resource is a time-frequency resource that is in the first subframe and used to transmit feedback information; the transmitter is further configured to: before sending the first service to the first communications device on the first time-frequency resource in the first subframe, send third indication information to the first communications device, where the third indication information is used to indicate to the first communications device that the first subframe includes the first service, and to instruct the first communications device to receive the first service on the time-frequency resource that is in the first subframe and used to transmit feedback information. In the fourth possible implementation, the feedback subframe location is a location, in the first subframe, of a physical uplink shared channel resource.

In a fifth possible implementation of the sixth aspect, the first communications device is a base station, and the communications device is user equipment UE; the first time-frequency resource is a physical uplink control channel resource in the first subframe, and the second time-frequency resource is a physical uplink shared channel resource in the first subframe; or the first time-frequency resource is a part of a physical uplink shared channel resource, and the second time-frequency resource is a remaining part of the physical uplink shared channel resource; or the first time-frequency resource is a part of a physical uplink control channel resource and a part of a physical uplink shared channel resource, and the second time-frequency resource is a remaining part of the physical uplink shared channel resource. The receiver is further configured to: before the transmitter sends the first service to the first communications device on the first time-frequency resource in the first subframe, receive fourth indication information sent by the first communications device, where the fourth indication information is used to instruct the communications device to send the first service on the first time-frequency resource in the first subframe. In the fifth possible implementation, the feedback subframe location is a subframe that has a downlink transmission resource and that is closest to the first subframe and that can transmit feedback information.

In a sixth possible implementation of the sixth aspect, the first communications device is a base station, the communications device is user equipment UE, and the first subframe is a type-1 subframe. The receiver is further configured to: before the transmitter sends the first service to the first communications device on the first time-frequency resource in the first subframe, receive fifth indication information sent by the first communications device, where the fifth indication information is used to indicate to the communications device that the first time-frequency resource is a time-frequency resource that is in the first subframe and used to transmit feedback information.

In a seventh possible implementation of the sixth aspect, the first communications device is a base station, the communications device is user equipment UE, and the first subframe is a type-2 subframe. The receiver is further configured to: before the transmitter sends the first service to the first communications device on the first time-frequency resource in the first subframe, receive sixth indication information sent by the first communications device, where the sixth indication information is used to indicate to the communications device that the first time-frequency resource is a part of the physical uplink shared channel resource in the first subframe.

In the sixth or seventh possible implementation, the feedback subframe location is a next-next subframe of the first subframe.

In an eighth possible implementation of the sixth aspect, the first communications device is a base station, the communications device is user equipment UE, and the first subframe is a type-2 subframe. The receiver is further configured to: before the transmitter sends the first service to the first communications device on the first time-frequency resource in the first subframe, receive seventh indication information sent by the first communications device in a previous subframe of the first subframe, where the seventh indication information is used to indicate to the communications device that the first time-frequency resource is a part of the physical uplink shared channel resource in the first subframe. In the eighth possible implementation, the feedback subframe location is a next subframe of the first subframe.

With reference to any one of the first aspect to the sixth aspect, the first timing is less than a length of two subframes.

With reference to any one of the first aspect to the sixth aspect, the physical control channel resource includes the physical downlink control channel resource and the physical uplink control channel resource in the first subframe; the physical shared channel resource includes the physical downlink shared channel resource and the physical uplink shared channel resource in the first subframe; and the feedback resource includes the time-frequency resource that is in the first subframe and used to transmit feedback information.

For advantageous effects brought by the sixth aspect and the possible implementations of the sixth aspect, refer to the advantageous effects brought by the first aspect and the possible implementations of the first aspect, and details are not described herein again.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
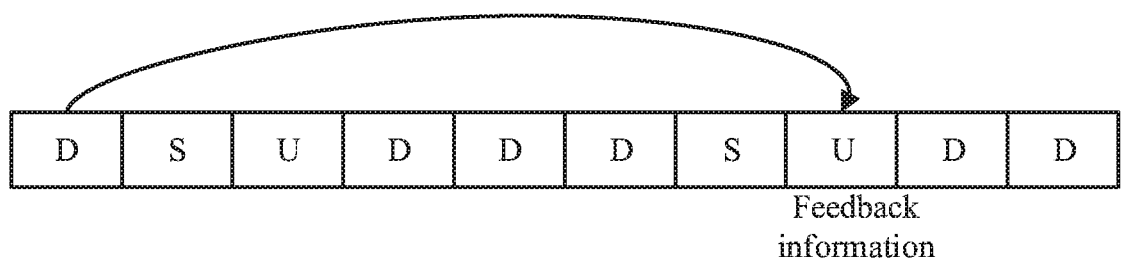
FIG. 1 is a schematic diagram of downlink HARQ timing according to the present invention.
Figure 2:
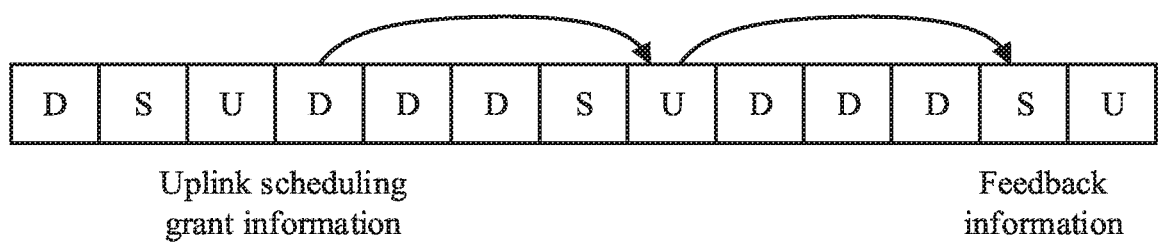
FIG. 2 is a schematic diagram of uplink HARQ timing according to the present invention.
Figure 3:
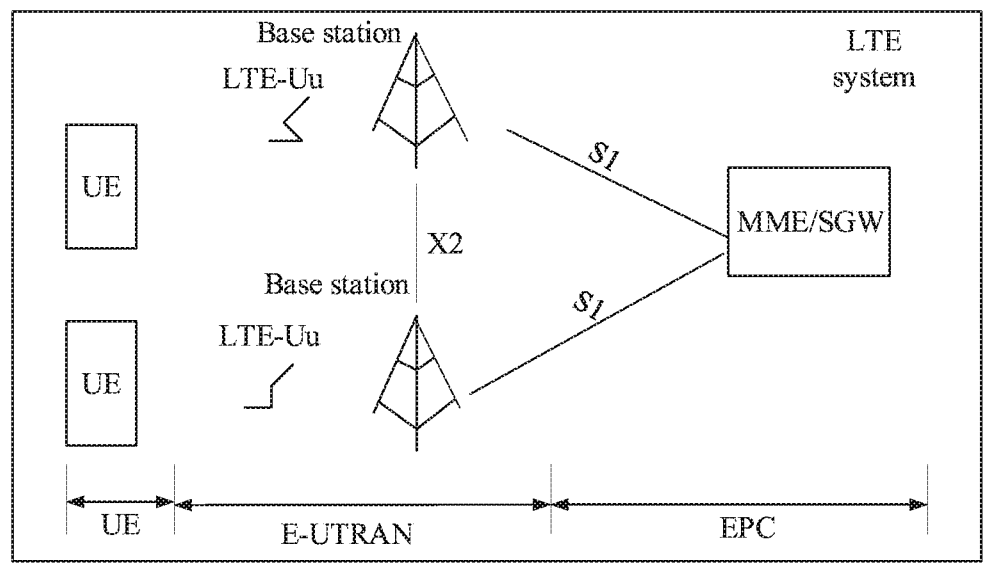
FIG. 3 is a schematic diagram of an architecture of an LTE system according to the present invention.

A service feedback method and a communications device in this application are applicable to a network architecture of an LTE system and are also applicable to a network architecture of a next-generation (4.5G or 5G) communications system. Referring to FIG. 3, an LTE system is used as an example. The LTE system includes user equipment, an evolved NodeB (eNodeB) and an evolved packet core (EPC). The EPC is responsible for a core network part, a signaling processing part is a mobility management entity (MME), and a data processing part is a serving gateway (S-GW). The eNodeB is responsible for an access network part, which is also referred to as an evolved UMTS terrestrial radio access network (evolved UTRAN). The LTE system supports interworking with other 3GPP systems. According to different duplex modes, LTE systems are classified into a Frequency Division Duplex LTE (FDD-LTE) system and a Time Division Duplex LTE (TDD-LTE) system.

A first communications device in this application may be a base station or UE. A second communications device in this application may be UE or a base station. When the first communications device is a base station, the second communications device is UE. When the first communications device is UE, the second communications device is a base station.

In addition, the base station in this application may be a device that communicates with a wireless terminal over an air interface in an access network by using one or more sectors. The base station may be configured to mutually convert a received over-the-air frame and an IP packet and serve as a router between the wireless terminal and a remaining portion of the access network. The remaining portion of the access network may include an Internet Protocol (IP) network. The base station may also coordinate attribute management of the air interface. For example, the base station may be an evolved NodeB (NodeB, eNB or e-NodeB) in LTE, which is not limited in this application.

The UE in this application may be a wireless terminal. The wireless terminal may include a device that provides a user with voice and/or data service. Optionally, the device may be a handheld device with a wireless connection function, or another processing device connected to a wireless modem. In addition, the wireless terminal may communicate with one or more core networks by using a radio access network (such as RAN). For example, the wireless terminal may specifically be a mobile terminal, such as a mobile phone (also referred to as a "cellular" phone) and a computer with a mobile terminal. The computer with a mobile terminal may be a portable, pocket-sized, handheld, computer built-in, or in-vehicle mobile apparatus, which exchanges voice and/or data with the core networks.

Figure 4:
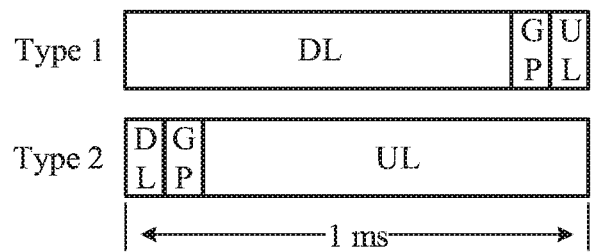
FIG. 4 is a schematic diagram of a structure of a new frame according to the present invention.

It should be noted that a first subframe in the embodiments of the present invention may be a subframe in a radio frame with any configuration in an LTE system, or may be a new frame with a structure (a type-1 subframe or a type-2 subframe) shown in FIG. 4. The first service may be a service whose feedback latency is less than a preset latency threshold. For example, the first service may be a low-latency service, and the first service may be data carried on a physical uplink shared channel or a physical downlink shared channel, that is, the first service may also be referred to as first data. A second service may be a service whose feedback latency is greater than or equal to a preset latency threshold. The second service may also be data carried on a physical uplink shared channel or a physical downlink shared channel, that is, the second service may also be referred to as second data. DL represents a downlink transmission resource used to transmit downlink information (may be downlink data or downlink control information). UL represents an uplink transmission resource used to transmit uplink information (may be uplink data or uplink control information). GP represents a resource used for a guard interval.

The embodiments of the present invention provide a service feedback method and a communications device, to resolve a technical problem that a period from sending service data to feedback is excessively long and a low latency requirement of a low-latency service cannot be met in the prior art.

Specific embodiments are used below to describe in detail the technical solutions of the present invention. The following several specific embodiments may be combined with each other, and a same or similar concept or procedure may not be described repeatedly in some embodiments.

Figure 5:
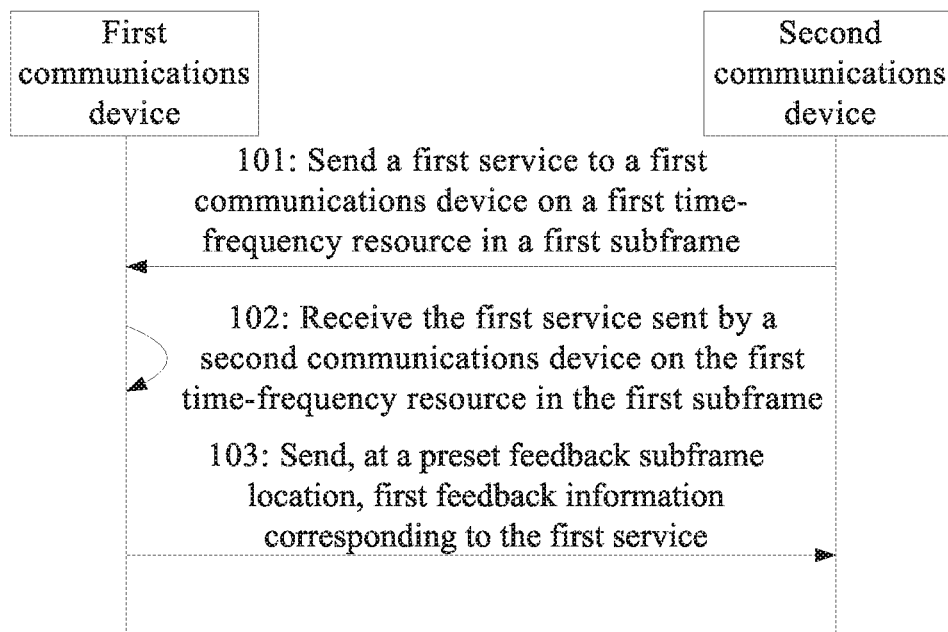
FIG. 5 is a signaling flowchart of a service feedback method according to a first embodiment of the present invention.

FIG. 5 is a signaling flowchart of a service feedback method according to a first embodiment of the present invention. In this embodiment, after a second communications device sends a first service on a first time-frequency resource in a first subframe, a first communications device sends first feedback information (the first feedback information may be ACK or NACK information, and the following second feedback information may be ACK or NACK information) to the second communications device at a preset subframe location, to meet a low-latency feedback requirement of a low-latency service. In this embodiment, the first communications device may be a base station and the second communications device may be UE, or the first communications device may be UE and the second communications device may be a base station. That is, the method in this embodiment may be a process in which the base station sends feedback information to the UE when receiving the first service sent by the UE, or may be a process in which the UE sends feedback information to the base station after receiving the first service sent by the base station.

As shown in FIG. 5, the method includes the following steps.

Step S101: The second communications device sends the first service to the first communications device on the first time-frequency resource in the first subframe.

Specifically, when the first communications device is the UE and the second communications device is the base station, the base station may determine to send the first service to the UE on the first time-frequency resource in the first subframe. The first subframe is a downlink subframe. When the first communications device is the base station and the second communications device is the UE, the UE determines, according to a scheduling indication of the base station, that the UE sends the first service on the first time-frequency resource in the first subframe. The first subframe is an uplink subframe. Optionally, the first service may be a low-latency service.

The first time-frequency resource may include a physical control channel resource in the first subframe, or may include a physical shared channel resource, or may include a physical control channel resource and a physical shared channel resource.

Specifically, the first time-frequency resource may include at least one time-frequency resource of a physical downlink control channel resource in the first subframe, a physical downlink shared channel resource in the first subframe, a physical uplink control channel resource, a physical uplink shared channel resource, or a time-frequency resource used to transmit feedback information. The physical downlink control channel resource may be a time-frequency resource used for transmitting information on a physical downlink control channel (PDCCH) in the first subframe, or may be a time-frequency resource used to transmit E-PDCCH information in the first subframe. The physical uplink control channel resource may be a time-frequency resource used to transmit information on a physical uplink control channel (PUCCH) in the first subframe, or may be a resource used to transmit E-PUCCH information in the first subframe. The physical downlink shared channel resource may be a time-frequency resource used to transmit information on a physical downlink shared channel (PDSCH) in the first subframe, or may be a time-frequency resource used to transmit E-PDCCH information. The physical uplink shared channel resource may be a time-frequency resource used to transmit information on a physical uplink shared channel (PUSCH) in the first subframe. The time-frequency resource used to transmit feedback information may be an uplink transmission resource used to transmit PUCCH information and a reference signal in a type-1 subframe, or may be a downlink transmission resource used to transmit feedback information and some pieces of downlink indication information (information transmitted over the PDCCH) in a type-2 subframe.

It should be noted that PDCCH information refers to information transmitted on a PDCCH channel, PUCCH information refers to information transmitted on a PUCCH channel, PDSCH information refers to information transmitted on a PDSCH channel, and PUSCH information refers to information transmitted on a PUSCH channel.

After the second communications device sends the first service to the first communications device on the first time-frequency resource, the second communications device sends a second service to the first communications device on a second time-frequency resource. Optionally, the second service is a conventional service that has a relatively low requirement on a latency. A type of the second time-frequency resource may be the same as or different from a type of the first time-frequency resource. For example, when the first time-frequency resource is the physical downlink control channel resource in the first subframe, the second time-frequency resource may be the physical downlink shared channel resource in the first subframe. For another example, when the first time-frequency resource is a part of the physical downlink shared channel resource in the first subframe, the second time-frequency resource may be a remaining part of the physical downlink shared channel resource.

S102: The first communications device receives the first service sent by the second communications device on the first time-frequency resource in the first subframe.

Specifically, when the first communications device is the UE and the second communications device is the base station, the second communications device may instruct the first communications device to receive the first service on a corresponding resource location (for example, on the first time-frequency resource) in the first subframe. When the first communications device is the base station and the second communications device is the UE, the first communications device may instruct the second communications device to send the first service on the first time-frequency resource, so that the first communications device may receive, on a corresponding resource location (for example, on the first time-frequency resource), the first service sent by the second communications device.

S103: The first communications device sends, at a preset feedback subframe location, first feedback information corresponding to the first service.

An interval between a subframe location corresponding to the first time-frequency resource in the first subframe and the feedback subframe location is a first timing (e.g., a first duration). An interval between a subframe location corresponding to the second time-frequency resource used by the second communications device to send the second service and a subframe location corresponding to a third time-frequency resource used by the first communications device to send second feedback information to the second communications device is a second timing (e.g., a second duration). The first timing is less than the second timing.

Specifically, as described above, the first subframe corresponds to different types of time-frequency resources, and the different types of time-frequency resources correspond to different subframe locations in the first subframe. After receiving the first service, the first communications device may send the first feedback information corresponding to the first service to the second communications device at the preset feedback subframe location. The interval between the preset feedback subframe location and the subframe location corresponding to the first time-frequency resource may be referred to as the first timing. After receiving the second service, the first communications device sends the second feedback information to the second communications device at a third time-frequency resource location in the first subframe. For details about a feedback mechanism, refer to the current system. For example, the interval between the subframe location corresponding to the second time-frequency resource and the subframe location corresponding to the third time-frequency resource is at least four subframes or is four subframes. In this embodiment, the interval between the subframe location corresponding to the second time-frequency resource and the subframe location corresponding to the third time-frequency resource is referred to as the second timing. The first timing is less than the second timing, That is, in this embodiment of the present invention, the first service may be sent on a physical control channel resource or a physical shared channel resource, and the first service is sent before the second service, so that the first communications device has sufficient time to process the first service after receiving the first service. This ensures that a latency between sending the first service and receiving the first feedback information corresponding to the first service is less than a latency between sending the second service and receiving the second feedback information corresponding to the second service, that is, less than a feedback latency of a conventional service. Therefore, according to the service feedback method provided in this embodiment of the present invention, a period from sending data to feedback of a low-latency service can be shortened, a low latency requirement of the low-latency service can be met, and communication quality of the low-latency service can be improved.

According to the service feedback method provided in this embodiment of the present invention, the second communications device sends the first service to the first communications device on the first time-frequency resource, so that the first communications device has sufficient time to process the first service after receiving the first service. The time-frequency resource in the first subframe is re-allocated and the first communications device may send the first feedback information to the second communications device at the preset feedback subframe location, so as to ensure that a latency (that is, the first timing) between sending the first service and receiving the first feedback information corresponding to the first service is less than a latency (that is, the second timing) between sending the second service and receiving the second feedback information corresponding to the second service, that is, less than a feedback latency of a conventional service. Therefore, according to the service feedback method provided in this embodiment of the present invention, a period from sending data to feedback of a low-latency service is shortened and a low latency requirement of the low-latency service is met.

Further, a length of the first timing may be less than a length of two subframes, and a length of the second timing may be greater than a length of four subframes. Optionally, the preset feedback subframe location may be determined by the first communications device, or may be determined by the first communications device after being instructed by the second communications device. For details, refer to the following two possible implementations:

In a first possible implementation, the first communications device determines the feedback subframe location according to a type of the first service, a size of the first service, and a first mapping relationship. The first mapping relationship includes a correspondence between the first time-frequency resource and the first timing. The first timing may be used to indicate the feedback subframe location.

Specifically, after receiving the first service, the first communications device determines that the first service is a low-latency service according to the type of the first service. Optionally, the first service may carry the type of the first service. Then, the first communications device determines, according to the size of the first service and the preset first mapping relationship, the first timing corresponding to the first time-frequency resource. The first communications device may determine, according to the first timing and the subframe location corresponding to the first time-frequency resource in the first subframe, the feedback subframe location for sending the first feedback information, and further send the first feedback information at the feedback subframe location. In the first mapping relationship, the first timing corresponding to the first time-frequency resource varies with different subframe locations that are in the first subframe and correspond to the first time-frequency resource. Therefore, the finally determined feedback subframe location is different. Optionally, the feedback subframe location may be located in the first subframe, may be located in a next subframe of the first subframe, or may be located in a next-next subframe of the first subframe. For details, refer to descriptions of the following embodiment.

In a second possible implementation, the second communications device determines the feedback subframe location according to a type of the first service, a size of the first service, and a first mapping relationship, and sends the feedback subframe location to the first communications device, to instruct the first communications device to send the first feedback information at the feedback subframe location. The first mapping relationship includes a correspondence between the first time-frequency resource and the first timing.

Specifically, before sending the first service to the first communications device, the second communications device learns the type and the size of the first service in advance. When determining that the type of the first service is a low-latency service, the second communications device may determine, according to the size of the first service and the preset first mapping relationship, the first timing corresponding to the first time-frequency resource, and determine, according to the first timing and the subframe location corresponding to the first time-frequency resource in the first subframe, the feedback subframe location for sending the first feedback information by the first communications device. Further, the second communications device sends the feedback subframe location to the first communications device, so that the first communications device sends the first feedback information at the feedback subframe location. In the first mapping relationship, the first timing corresponding to the first time-frequency resource varies with different subframe locations that are in the first subframe and correspond to the first time-frequency resource. Therefore, the finally determined feedback subframe location is different. Optionally, the feedback subframe location may be located in the first subframe, may be located in a next subframe of the first subframe, or may be located in a next-next subframe of the first subframe. For details, refer to descriptions of the following embodiment.

There may usually be two systems in the foregoing service feedback scenario: One is a system that does not use a new frame structure shown in FIG. 4, and the other is a system that uses the new frame structure shown in FIG. 4. The following describes in detail a service feedback process in the two systems by using different embodiments.

Figure 6:
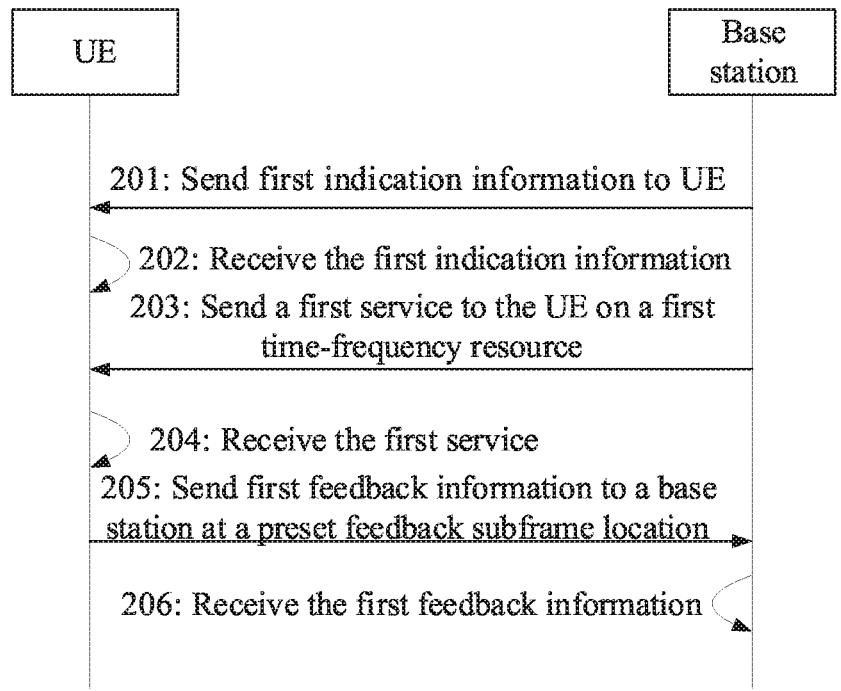
FIG. 6 is a signaling flowchart of a service feedback method according to a second embodiment of the present invention.

FIG. 6 is a signaling flowchart of a service feedback method according to a second embodiment of the present invention. This embodiment is applicable to a system that does not use a new frame structure shown in FIG. 4. This embodiment relates to a process in which UE feeds back to a first service sent by a base station. A first communications device is the UE, and a second communications device is the base station. To clearly understand the solution, the first communications device is replaced by the UE, and the second communications device is replaced by the base station. As shown in FIG. 6, the method includes the following steps.

Step S201: The base station sends first indication information to the UE.

The first indication information is used to indicate to the UE that the first subframe includes the first service. Optionally, the base station may use a PDCCH to send the first indication information to the UE on a PDCCH resource in the first subframe.

S202: The UE receives the first indication information.

After detecting the first indication information, the UE learns that the current first subframe includes the first service, and therefore the UE waits to receive the first service.

S203: The base station sends the first service to the UE on a first time-frequency resource.

Figure 7:
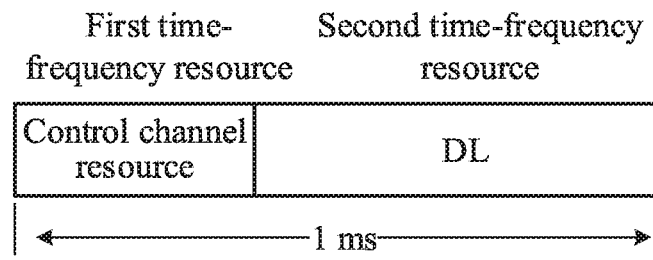
FIG. 7 is a first schematic diagram of a structure of a resource location of a first subframe according to the present invention.
Figure 8:
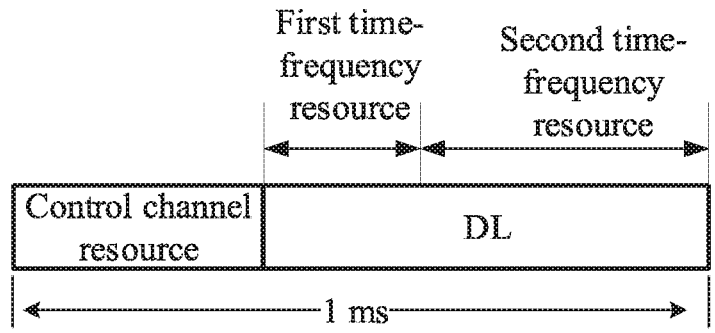
FIG. 8 is a second schematic diagram of a structure of a resource location of a first subframe according to the present invention.
Figure 9:
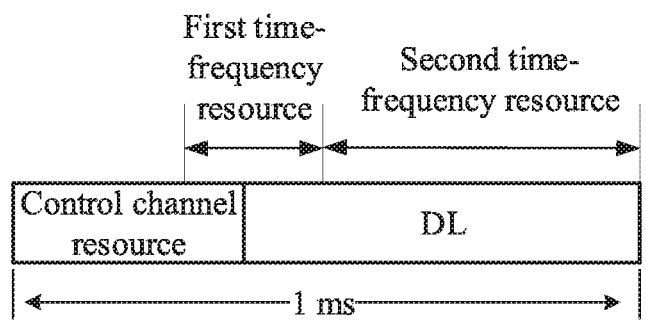
FIG. 9 is a third schematic diagram of a structure of a resource location of a first subframe according to the present invention.

In this embodiment, the first time-frequency resource may be a physical downlink control channel resource in the first subframe, and a second time-frequency resource used by the base station to send a second service is a physical downlink shared channel resource in the first subframe (referring to a first schematic diagram of a structure of a resource location of a first subframe shown in FIG. 7). Alternatively, the first time-frequency resource is a part of a physical downlink shared channel resource in the first subframe, and a second time-frequency resource used by the base station to send a second service is a remaining part of the physical downlink shared channel resource in the first subframe (referring to a second schematic diagram of a structure of a resource location of a first subframe shown in FIG. 8). Alternatively, the first time-frequency resource is a part of a physical downlink control channel resource in the first subframe and a part of a physical downlink shared channel resource in the first subframe, and a second time-frequency resource used by the base station to send a second service is a remaining part of the physical downlink shared channel resource in the first subframe (referring to a third schematic diagram of a structure of a resource location of a first subframe shown in FIG. 9).

Step S204: The UE receives the first service.

Step S205: The UE sends first feedback information to the base station at a preset feedback subframe location.

Figure 10:
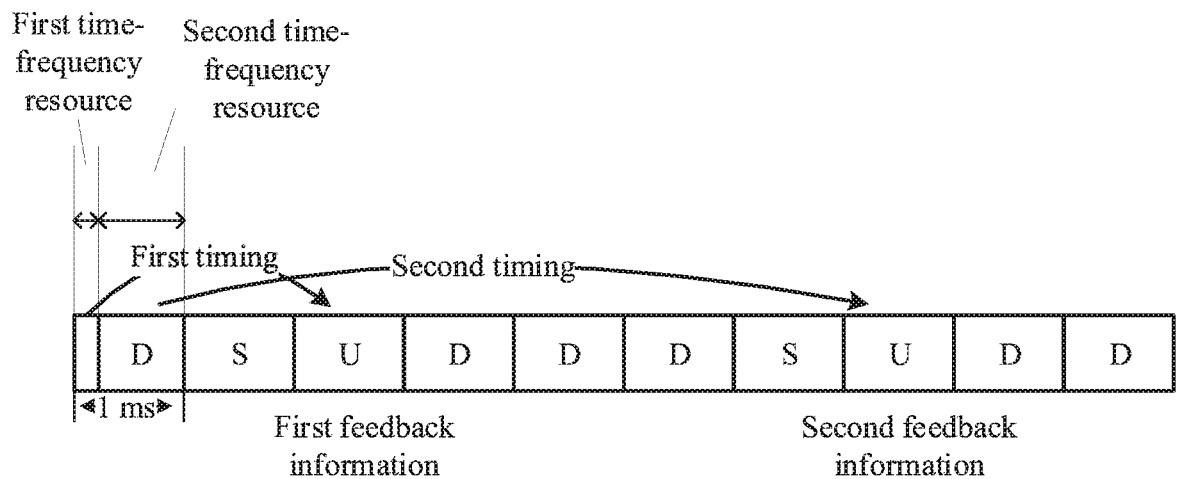
FIG. 10 is a first schematic diagram of a structure of a radio frame according to the present invention.

Specifically, the preset feedback subframe location may be determined by the UE, or may be sent by the base station to the UE after being determined by the base station. For a specific determining manner, refer to the foregoing two possible implementations, and details are not described herein again. In this embodiment, the feedback subframe location at which the UE sends the first feedback information to the base station is a subframe, in a radio frame, that has an uplink transmission resource and that is closest to the first subframe and that can transmit feedback information. For example, referring to a first schematic diagram of a structure of a radio frame shown in FIG. 10, the first subframe is a subframe 0, the first time-frequency resource corresponds to a first part of the subframe 0, and the base station sends the first service on the resource part. The feedback subframe location is located in a subframe 2, that is, the UE sends the first feedback information in the subframe 2. A time interval between the subframe 0 and the subframe 2 is first timing. The base station sends the second service on a time-frequency resource, which is in a second half part of the subframe 0, that is, a location, of the second time-frequency resource, in the subframe 0 is the second half part of the subframe 0. A subframe location corresponding to a third time-frequency resource is located in a subframe 7. A time interval between the subframe location corresponding to the second time-frequency resource and the subframe location corresponding to the third time-frequency resource is second timing. The second timing is for a feedback mechanism of a conventional service. It can be seen from FIG. 10 that the first timing is less than the second timing. Therefore, according to the service feedback method provided in this embodiment of the present invention, a feedback latency of the first service is greatly shortened. Optionally, any subframe, in a radio frame, that has an uplink transmission resource and that is closest to the first subframe and that can transmit feedback information may be used as the feedback subframe location. For example, when a special subframe 1 in FIG. 10 has an uplink transmission resource that can transmit feedback information, the special subframe 1 may be used as the feedback subframe location. Certainly, in an actual example in this embodiment, there is no uplink transmission resource that can be used to transmit feedback information in the special subframe 1, and therefore the subframe 2 is used as the feedback subframe location.

Step S206: The base station receives the first feedback information.

Figure 11:
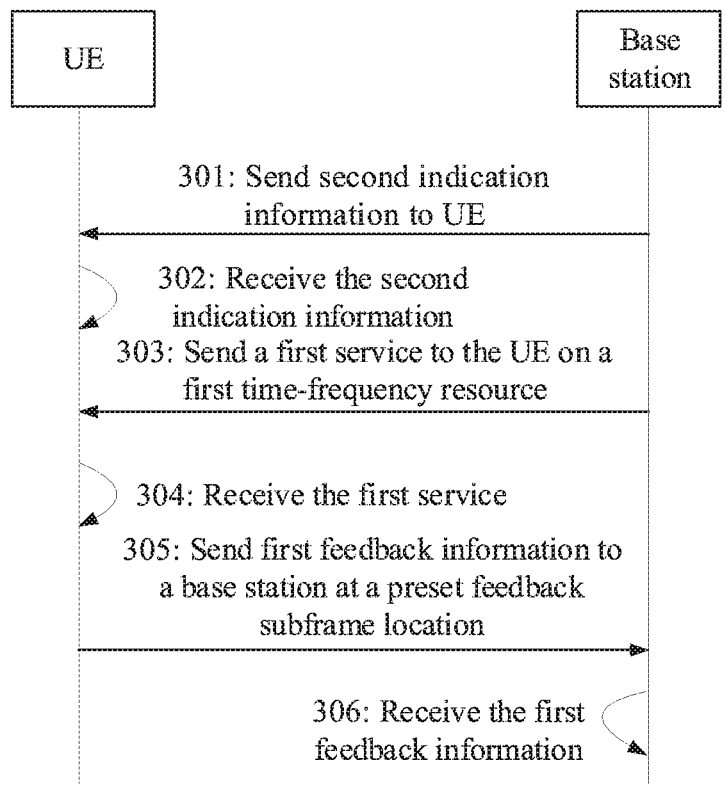
FIG. 11 is a signaling flowchart of a service feedback method according to a third embodiment of the present invention.

FIG. 11 is a signaling flowchart of a service feedback method according to a third embodiment of the present invention. This embodiment is applicable to a system that uses a new frame structure shown in FIG. 4. A first subframe in this embodiment is a type-1 subframe. This embodiment relates to another specific process in which UE feeds back to a first service sent by a base station. A first communications device is the UE, and a second communications device is the base station. To clearly understand the solution, the first communications device is replaced by the UE, and the second communications device is replaced by the base station. As shown in FIG. 11, the method includes the following steps.

Step S301: The base station sends second indication information to the UE.

The second indication information is used to indicate to the UE that the first subframe includes the first service, and instruct the UE to receive the first service on a part of a physical downlink shared channel resource in the first subframe, that is, instruct the UE to receive the first service on a first time-frequency resource (that is, the base station sends the first service on the first time-frequency resource, and correspondingly the UE also receives the first service on the first time-frequency resource). Optionally, the base station may use a PDCCH to send the second indication information to the UE on a PDCCH resource in the first subframe.

Step S302: The UE receives the second indication information.

Specifically, after receiving the second indication information, the UE may determine, according to the second indication information, to receive the first service on the first time-frequency resource.

Step S303: The base station sends the first service to the UE on the first time-frequency resource.

Figure 12:
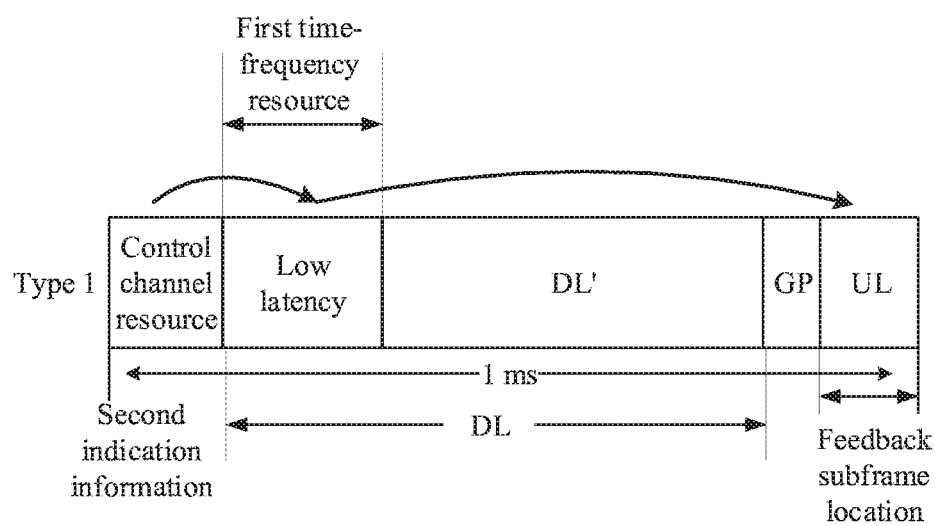
FIG. 12 is a fourth schematic diagram of a structure of a resource location of a first subframe according to the present invention.

In this embodiment, the first time-frequency resource may be the part of the physical downlink shared channel resource in the first subframe in S301. For details, refer to a fourth schematic diagram of a structure of a resource location of a first subframe (type 1) shown in FIG. 12. In FIG. 12, the type-1 subframe includes a physical downlink control channel resource ctrl (the second indication information may be transmitted on the part of the physical downlink shared channel resource), a physical downlink shared channel resource DL, a guard interval (GP) resource GP, and a time-frequency resource UL used to transmit feedback information and a reference signal on a PUCCH. In this embodiment, the base station uses a part (a low-latency part in FIG. 12) of the physical downlink shared channel resource DL in the first subframe as the first time-frequency resource to send the first service, and uses a remaining part (DL') of the physical downlink shared channel resource DL as a second time-frequency resource to send a second service.

Step S304: The UE receives the first service.

Optionally, also referring to FIG. 12, the UE also receives the first service in the low latency part of the first subframe shown in FIG. 12.

Step S305: The UE sends first feedback information to the base station at a preset feedback subframe location.

Specifically, the preset feedback subframe location may be determined by the UE, or may be sent by the base station to the UE after being determined by the base station. For a specific determining manner, refer to the foregoing two possible implementations, and details are not described herein again. In this embodiment, the feedback subframe location at which the UE sends the first feedback information to the base station is a location of a time-frequency resource that is in the first subframe and used for transmitting feedback information, that is, the time-frequency resource UL in the first subframe shown in FIG. 12. In other words, after receiving the first service, the UE may send the first feedback information to the base station by using an uplink transmission resource of the current first subframe before the current first subframe ends, and does not need to send the first feedback information in another subframe. Therefore, according to this embodiment of the present invention, time used by the UE to feed back to the first service of the base station is greatly reduced, and therefore, a feedback latency of the first service is shortened.

Step S306: The base station receives the first feedback information.

Figure 13:
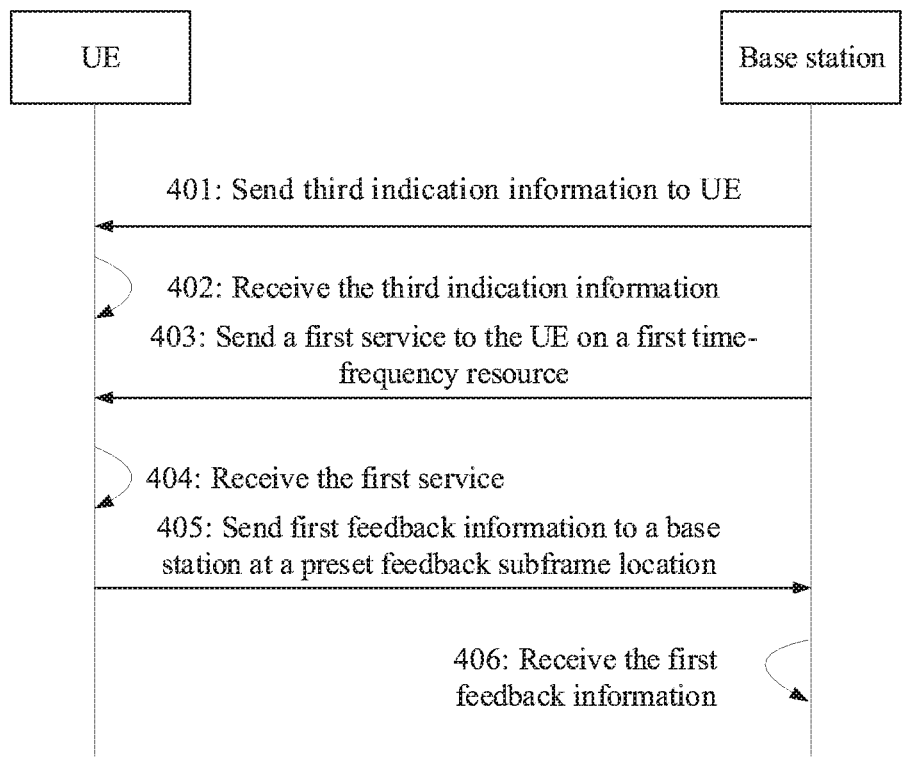
FIG. 13 is a schematic flowchart of a service feedback method according to a fourth embodiment of the present invention.

FIG. 13 is a schematic flowchart of a service feedback method according to a fourth embodiment of the present invention. This embodiment is applicable to a system that uses a new frame structure shown in FIG. 4. A first subframe in this embodiment is a type-2 subframe. This embodiment relates to another specific process in which UE feeds back to a first service sent by a base station. A first communications device is the UE, and a second communications device is the base station. To clearly understand the solution, the first communications device is replaced by the UE, and the second communications device is replaced by the base station. As shown in FIG. 13, the method includes the following steps.

Step S401: The base station sends third indication information to the UE.

The third indication information is used to indicate to the UE that the first subframe includes the first service, and instruct the UE to receive the first service on a time-frequency resource that is in the first subframe and used to transmit feedback information, that is, instruct the UE to receive the first service on a first time-frequency resource (that is, the base station sends the first service on the first time-frequency resource, and correspondingly the UE also receives the first service on the first time-frequency resource). Optionally, the base station may send the third indication information to the UE on a PDCCH.

Step S402: The UE receives the third indication information.

Specifically, after receiving the third indication information, the UE may determine, according to the third indication information, to receive the first service on the first time-frequency resource.

Step S403: The base station sends the first service to the UE on the first time-frequency resource.

Figure 14:
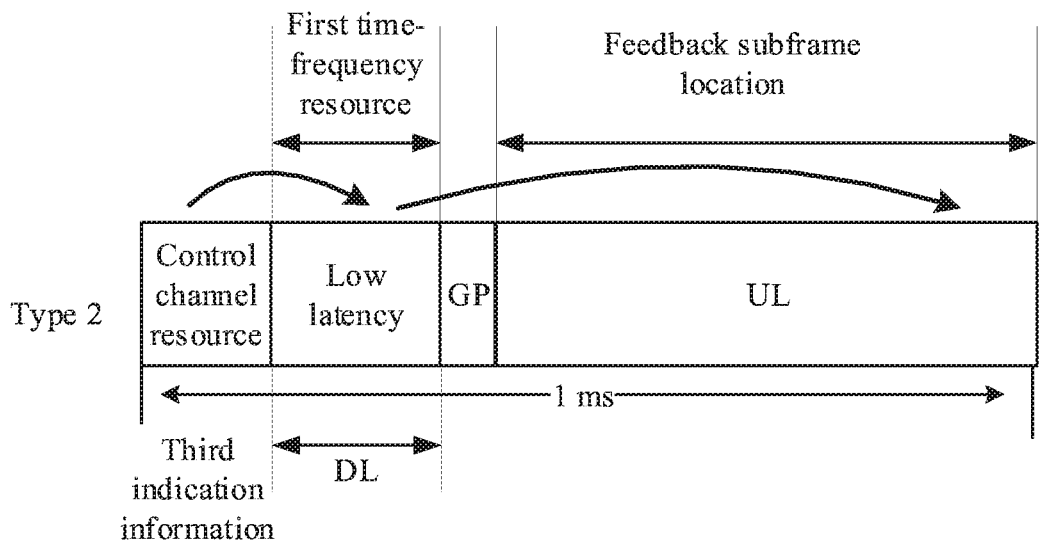
FIG. 14 is a fifth schematic diagram of a structure of a resource location of a first subframe according to the present invention.

In this embodiment, the first time-frequency resource may be the time-frequency resource used to transmit feedback information in S401. For details, refer to a fifth schematic diagram of a structure of a resource location of a first subframe (type 2) shown in FIG. 14. In FIG. 14, the type-2 subframe includes a physical downlink control channel resource ctrl (the third indication information may be transmitted on a part of the physical downlink shared channel resource), a time-frequency resource DL used to transmit feedback information and downlink indication information (such as PDCCH information), a guard interval (GP) resource GP, and a physical uplink shared channel resource UL. In this embodiment, the base station uses the time-frequency resource DL (a low-latency part in FIG. 14) that is in the first subframe and used to transmit feedback information as the first time-frequency resource to send the first service.

Step S404: The UE receives the first service.

Optionally, also referring to FIG. 14, the UE also receives the first service on the time-frequency resource DL that is in the first subframe and used to transmit feedback information shown in FIG. 14.

Step S405: The UE sends first feedback information to the base station at a preset feedback subframe location.

Specifically, the preset feedback subframe location may be determined by the UE, or may be sent by the base station to the UE after being determined by the base station. For a specific determining manner, refer to the foregoing two possible implementations, and details are not described herein again. In this embodiment, the feedback subframe location at which the UE sends the first feedback information to the base station is a location of a physical uplink shared channel resource in the first subframe, that is, the physical uplink shared channel resource UL in the first subframe shown in FIG. 14. In other words, after receiving the first service, the UE may send the first feedback information to the base station by using an uplink transmission resource of the current first subframe before the current first subframe ends, and does not need to send the first feedback information in another subframe. Therefore, according to this embodiment of the present invention, time used by the UE to feed back to the first service of the base station is greatly reduced, and therefore, a feedback latency of the first service is shortened.

Step S406: The base station receives the first feedback information.

In conclusion, the foregoing second embodiment to the fourth embodiment all relate to a downlink feedback process in which the first communications device is the UE and the second communications device is the base station. The following embodiments describe an uplink feedback process in which the first communications device is the base station and the second embodiment is the UE. To clearly understand the solution, the first communications device is replaced by the base station, and the second communications device is replaced by the UE.

Figure 15:
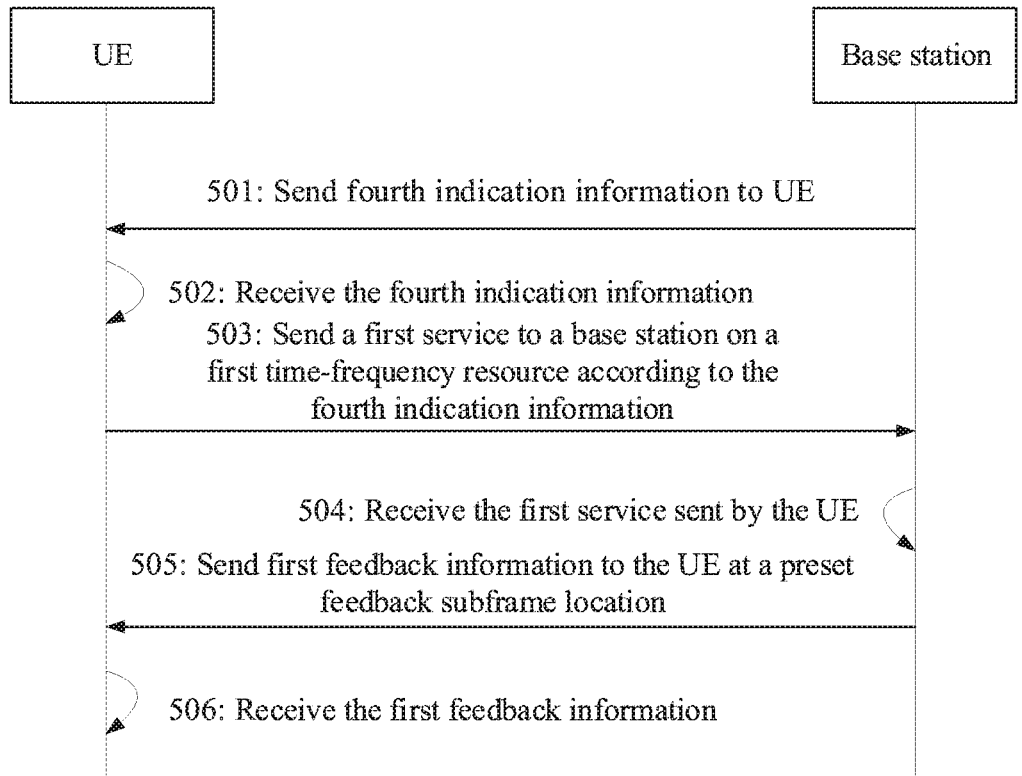
FIG. 15 is a schematic flowchart of a service feedback method according to a fifth embodiment of the present invention.

FIG. 15 is a schematic flowchart of a service feedback method according to a fifth embodiment of the present invention. This embodiment is applicable to a system that does not use a new frame structure shown in FIG. 4, and this embodiment relates to a process in which a base station feeds back to a first service sent by UE. As shown in FIG. 15, the method includes the following steps.

Step S501: The base station sends fourth indication information to the UE.

Figure 16:
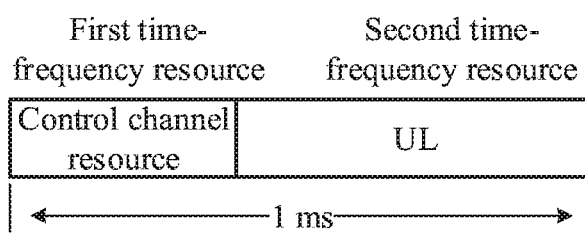
FIG. 16 is a sixth schematic diagram of a structure of a resource location of a first subframe according to the present invention.
Figure 17:
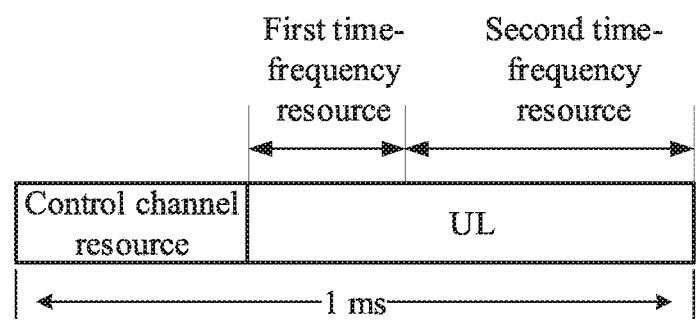
FIG. 17 is a seventh schematic diagram of a structure of a resource location of a first subframe according to the present invention.
Figure 18:
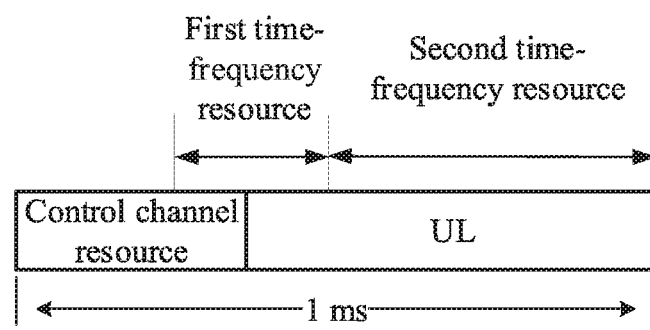
FIG. 18 is an eighth schematic diagram of a structure of a resource location of a first subframe according to the present invention.

The fourth indication information is used to instruct the UE to send the first service on a first time-frequency resource in a first subframe. Optionally, the base station may send the fourth indication information to the UE on a PDCCH. The fourth indication information may be uplink scheduling grant (UL grant) information. In this embodiment, the first time-frequency resource may be a physical uplink control channel resource in the first subframe, and a second time-frequency resource used by the base station to send a second service is a physical uplink shared channel resource in the first subframe (referring to a sixth schematic diagram of a structure of a resource location of a first subframe shown in FIG. 16). Alternatively, the first time-frequency resource is a part of a physical uplink shared channel resource in the first subframe, and a second time-frequency resource used by the base station to send a second service is a remaining part of the physical uplink shared channel resource in the first subframe (referring to a seventh schematic diagram of a structure of a resource location of a first subframe shown in FIG. 17). Alternatively, the first time-frequency resource is a part of a physical uplink control channel resource in the first subframe and a part of a physical uplink shared channel resource in the first subframe, and a second time-frequency resource used by the base station to send a second service is a remaining part of the physical uplink shared channel resource in the first subframe (referring to an eighth schematic diagram of a structure of a resource location of a first subframe shown in FIG. 18).

Step S502: The UE receives the fourth indication information.

Step S503: The UE sends the first service to the base station on the first time-frequency resource according to the fourth indication information.

Step S504: The base station receives the first service sent by the UE.

Step S505: The base station sends first feedback information to the UE at a preset feedback subframe location.

Figure 19:
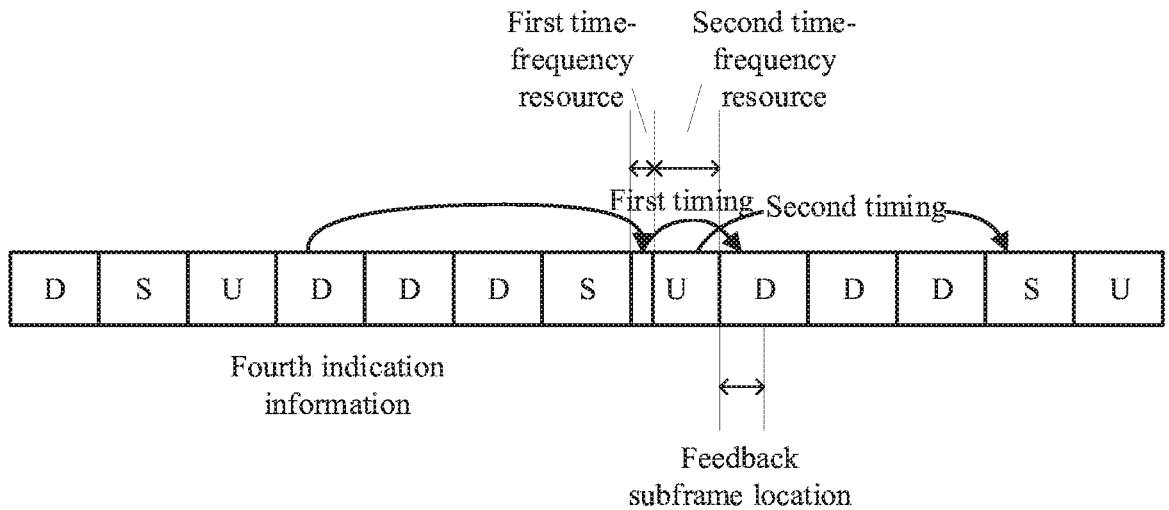
FIG. 19 is a second schematic diagram of a structure of a radio frame according to the present invention.

Specifically, the preset feedback subframe location may be determined by the base station, or may be determined by the UE and notified to the base station. For a specific determining manner, refer to the foregoing two possible implementations, and details are not described herein again. In this embodiment, the feedback subframe location at which the base station sends the first feedback information to the UE is a subframe, in a radio frame, that has a downlink transmission resource and that is closest to the first subframe and that can transmit feedback information. For example, referring to a second schematic diagram of a structure of a radio frame shown in FIG. 19, the first subframe is a subframe 7, the first time-frequency resource that is learned by the UE according to the fourth indication information sent by the base station corresponds to a first part of the subframe 7, and the UE sends the first service on this part. The feedback subframe location is located in a subframe 8, that is, the base station sends the first feedback information in the subframe 8. A time interval between the subframe 7 and the subframe 8 is first timing. The UE sends the second service on a time-frequency resource, which is in a second half part of the subframe 7, that is, a location, of the second time-frequency resource, in the subframe 7 is the second half part of the subframe 7. A subframe location corresponding to a third time-frequency resource is located in a subframe 1 of a next radio frame. A time interval between the subframe location corresponding to the second time-frequency resource and the subframe location corresponding to the third time-frequency resource is second timing. The second timing is for a feedback mechanism of a conventional service. It can be seen from FIG. 19 that the first timing is less than the second timing. Therefore, according to the service feedback method provided in this embodiment of the present invention, the time-frequency resource in the first subframe is re-allocated to greatly shorten a feedback latency of the first service. Optionally, any subframe, in a radio frame, that has a downlink transmission resource and that is closest to the first subframe and that can transmit feedback information may be used as the feedback subframe location. For example, when the subframe 8 in FIG. 19 does not have a downlink transmission resource that can transmit feedback information, a subframe 9 may be used as the feedback subframe location as long as the first timing is less than the second timing. Certainly, in an actual example in this embodiment, there is an uplink transmission resource that can be used to transmit feedback information in the subframe 8, and therefore the subframe 8 closest to the subframe 7 is used as the feedback subframe location.

Step S506: The UE receives the first feedback information.

Figure 20:
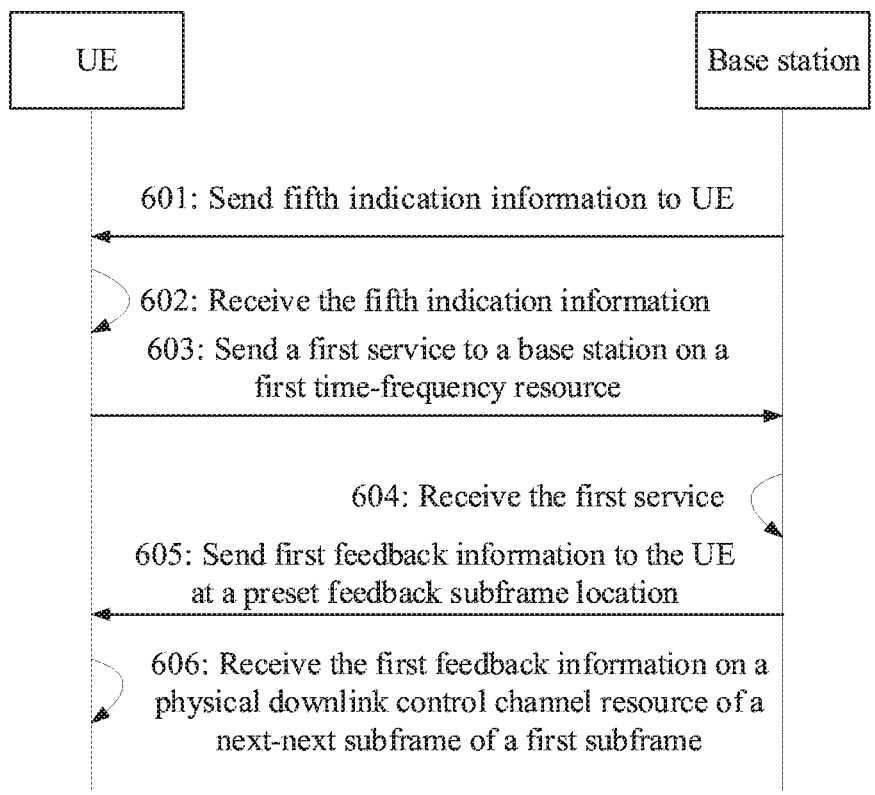
FIG. 20 is a signaling flowchart of a service feedback method according to a sixth embodiment of the present invention.

FIG. 20 is a signaling flowchart of a service feedback method according to a sixth embodiment of the present invention. This embodiment is applicable to a system that uses a new frame structure shown in FIG. 4. A first subframe in this embodiment is a type-1 subframe. This embodiment relates to another specific process in which a base station feeds back to a first service sent by UE. As shown in FIG. 20, the method includes the following steps.

Step S601: The base station sends fifth indication information to the UE.

The fifth indication information is used to indicate to the UE that a first time-frequency resource is a time-frequency resource that is in the first subframe and used to transmit feedback information, that is, instruct the UE to send the first service on the time-frequency resource that is in the first subframe and used to transmit feedback information. Optionally, the base station may send the fifth indication information to the UE on a PDCCH. The fifth indication information may be uplink scheduling grant (UL grant) information.

Figure 21:
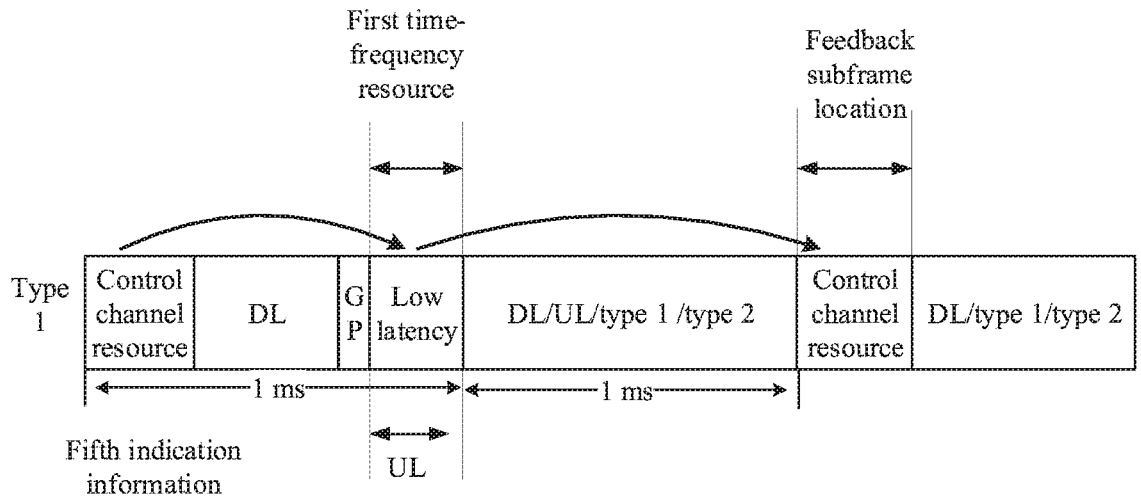
FIG. 21 is a ninth schematic diagram of a structure of a resource location of a first subframe according to the present invention.

For the first time-frequency resource in this embodiment, refer to a ninth schematic diagram of a structure of a resource location of a first subframe (type 1) shown in FIG. 21. In FIG. 21, the type-1 subframe includes a physical downlink control channel resource ctrl (the fifth indication information may be transmitted on a part of the physical downlink shared channel resource), a physical downlink shared channel resource DL, a guard interval (GP) resource GP, and a time-frequency resource UL used to transmit feedback information and a reference signal on a PUCCH. In this embodiment, the UE uses the time-frequency resource UL in the first subframe as the first time-frequency resource to send the first service (a low-latency part in FIG. 21).

Step S602: The UE receives the fifth indication information.

Step S603: The UE sends the first service to the base station on the first time-frequency resource.

Step S604: The base station receives the first service.

Step S605: The base station sends first feedback information to the UE at a preset feedback subframe location.

Specifically, the preset feedback subframe location may be determined by the base station, or may be determined by the UE and sent to the base station. For a specific determining manner, refer to the foregoing two possible implementations, and details are not described herein again. In this embodiment, the feedback subframe location at which the base station sends the first feedback information to the UE is a next-next subframe of the first subframe, that is, a feedback subframe location shown in FIG. 21. That is, the UE may transmit uplink data by using an uplink transmission resource at a tail of the current first subframe, and does not need to wait for one uplink subframe to transmit the uplink data. In this way, the base station may complete sending the first feedback information in a next-next subframe of the first subframe, and does not need to send the feedback information after waiting for at least four subframes in a same manner as a conventional service (that is, the second service). Therefore, according to the method provided in this embodiment of the present invention, a resource reuse location of the first service is defined to greatly reduce time used by the UE to feed back to the first service of the base station, so that a feedback latency of the first service is shortened, and low-latency user data transmission is implemented.

Step S606: The UE receives the first feedback information on a physical downlink control channel resource of the next-next subframe of the first subframe.

Figure 22:
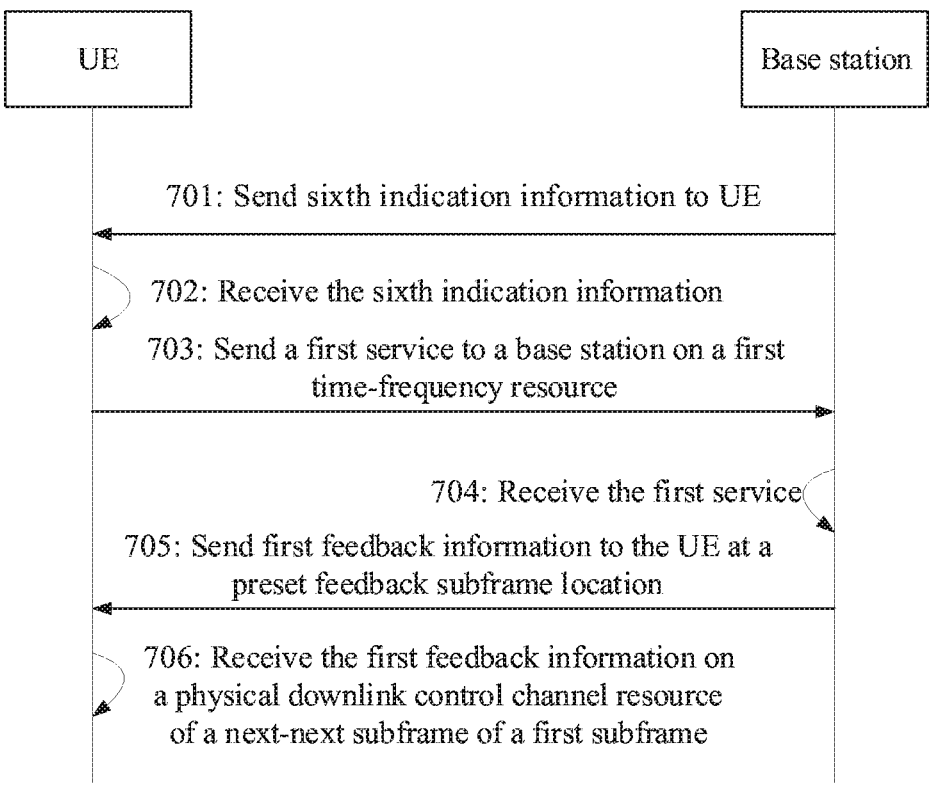
FIG. 22 is a signaling flowchart of a service feedback method according to a seventh embodiment of the present invention.

FIG. 22 is a signaling flowchart of a service feedback method according to a seventh embodiment of the present invention. This embodiment is applicable to a system that uses a new frame structure shown in FIG. 4. A first subframe in this embodiment is a type-2 subframe. This embodiment relates to another specific process in which a base station feeds back to a first service sent by UE. As shown in FIG. 22, the method includes the following steps.

Step S701: The base station sends sixth indication information to the UE.

The sixth indication information is used to indicate to the UE that a first time-frequency resource is a part of a physical uplink shared channel resource in the first subframe, that is, instruct the UE to send the first service on the part of the physical uplink shared channel resource in the first subframe. Optionally, the base station may send the sixth indication information to the UE on a PDCCH. The sixth indication information may be uplink scheduling grant (UL grant) information.

Figure 23:
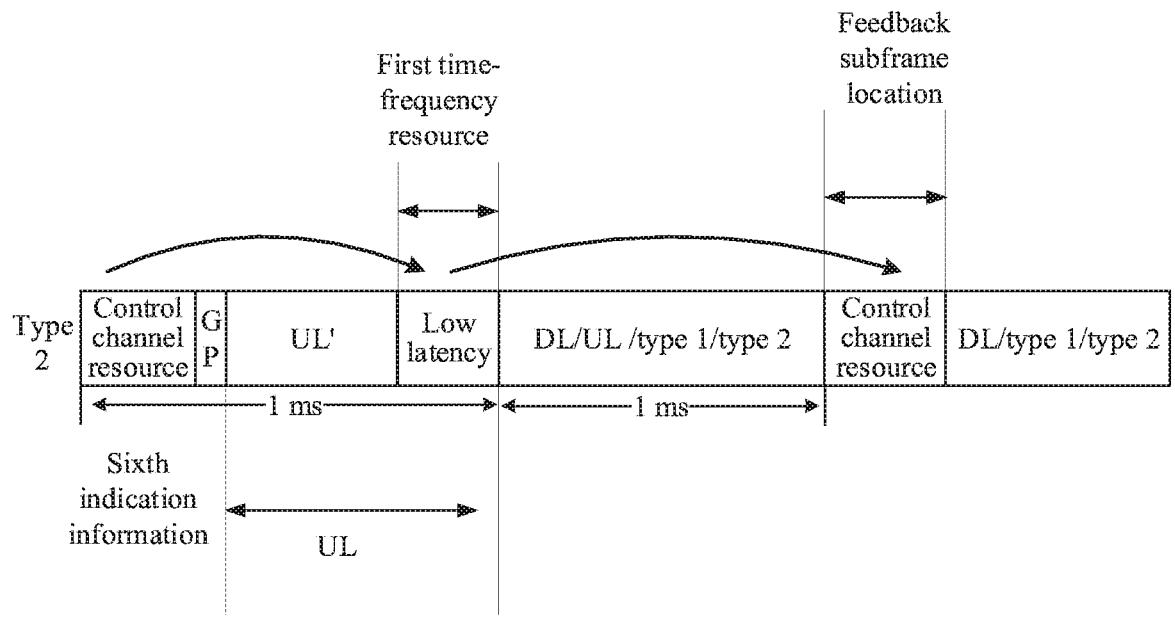
FIG. 23 is a tenth schematic diagram of a structure of a resource location of a first subframe according to the present invention.

For the first time-frequency resource in this embodiment, refer to a tenth schematic diagram of a structure of a resource location of a first subframe (type 2) shown in FIG. 23. In FIG. 23, the type-2 subframe includes a physical downlink control channel resource ctrl (the sixth indication information may be transmitted on a part of the physical downlink shared channel resource), a guard interval (GP) resource GP, and a physical uplink shared channel resource UL. In this embodiment, the UE uses a part (a low-latency part in FIG. 23) of the physical uplink shared channel resource UL in the first subframe as the first time-frequency resource to send the first service. UL' is a remaining part of the physical uplink shared channel resource.

Step S702: The UE receives the sixth indication information.

Step S703: The UE sends the first service to the base station on the first time-frequency resource.

Step S704: The base station receives the first service.

Step S705: The base station sends first feedback information to the UE at a preset feedback subframe location.

Specifically, the preset feedback subframe location may be determined by the base station, or may be determined by the UE and sent to the base station. For a specific determining manner, refer to the foregoing two possible implementations, and details are not described herein again. In this embodiment, the feedback subframe location at which the base station sends the first feedback information to the UE is a next-next subframe of the first subframe, that is, a feedback subframe location shown in FIG. 23. First timing between the feedback subframe location and a subframe location corresponding to the first time-frequency resource in the first subframe is less than a length of two subframes. According to the method provided in this embodiment of the present invention, reusing an UL resource of the physical uplink shared channel resource in the first subframe greatly reduces time used by the UE to feed back to the first service of the base station and shortens a feedback latency of the first service.

Step S706: The UE receives the first feedback information on a physical downlink control channel resource of the next-next subframe of the first subframe.

Optionally, feedback resource locations in the sixth embodiment and the seventh embodiment are designed for an uplink synchronous HARQ mechanism. For an uplink asynchronous HARQ mechanism, a determined feedback subframe location is a subframe location determined according to scheduling by the base station after the base station receives the first service. That is, for a process in which the base station feeds back to the UE in the uplink asynchronous HARQ mechanism is basically similar to that in the sixth embodiment and the seventh embodiment. The only difference lies in that the base station may determine a subframe feedback location according to the first time-frequency resource and a first mapping relationship, but the base station may choose not to perform feedback at the location according to an actual situation of the base station, and choose to send the first feedback information at another location.

Figure 24:
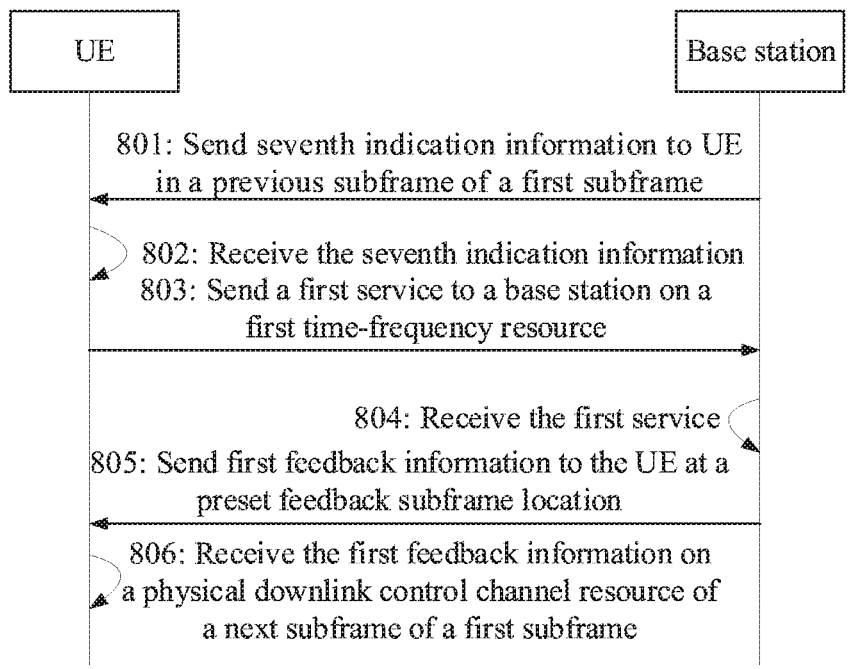
FIG. 24 is a signaling flowchart of a service feedback method according to an eighth embodiment of the present invention.

FIG. 24 is a signaling flowchart of a service feedback method according to an eighth embodiment of the present invention. This embodiment is applicable to a system that uses a new frame structure shown in FIG. 4. A first subframe in this embodiment is a type-2 subframe. This embodiment relates to another specific process in which a base station feeds back to a first service sent by UE. As shown in FIG. 24, the method includes the following steps.

Step S801: The base station sends seventh indication information to the UE in a previous subframe of the first subframe.

The seventh indication information is used to indicate to the UE that a first time-frequency resource is a part of a physical uplink shared channel resource in the first subframe, that is, instruct the UE to send the first service on the part of the physical uplink shared channel resource in the first subframe. Optionally, the base station may use a PDCCH to send the seventh indication information to the UE on a physical downlink control channel resource of the previous subframe. The seventh indication information may be uplink scheduling grant (UL grant) information.

Figure 25:
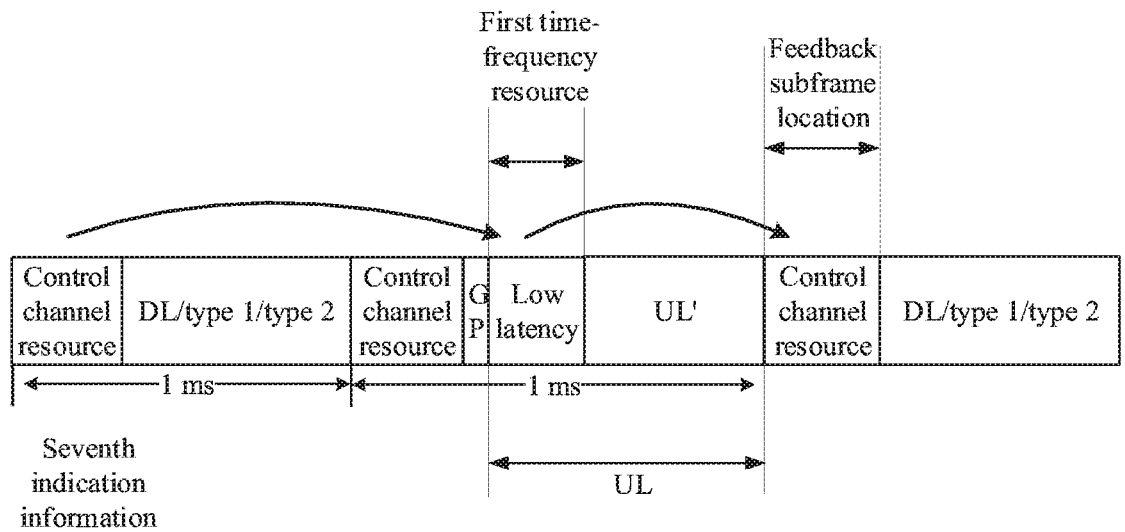
FIG. 25 is an eleventh schematic diagram of a structure of a resource location of a first subframe according to the present invention.

For the first time-frequency resource in this embodiment, refer to an eleventh schematic diagram of a structure of a resource location of a first subframe (type 2) shown in FIG. 25. In FIG. 25, the type-2 subframe includes a physical downlink control channel resource ctrl (the seventh indication information is transmitted on the physical downlink control channel resource of the previous subframe shown in FIG. 25), a guard interval (GP) resource GP, and a physical uplink shared channel resource UL. In this embodiment, the UE uses a part (a low-latency part in FIG. 25) of the physical uplink shared channel resource UL in the first subframe as the first time-frequency resource to send the first service. UL' is a remaining part of the physical uplink shared channel resource.

Step S802: The UE receives the seventh indication information.

Step S803: The UE sends the first service to the base station on the first time-frequency resource.

Step S804: The base station receives the first service.

Step S805: The base station sends first feedback information to the UE at a preset feedback subframe location.

Specifically, the preset feedback subframe location may be determined by the base station, or may be determined by the UE and sent to the base station. For a specific determining manner, refer to the foregoing two possible implementations, and details are not described herein again. In this embodiment, the feedback subframe location at which the base station sends the first feedback information to the UE is a next subframe of the first subframe, that is, a feedback subframe location shown in FIG. 25. First timing between the feedback subframe location and a subframe location corresponding to the first time-frequency resource in the first subframe is less than a length of two subframes. According to the method provided in this embodiment of the present invention, reusing an UL resource of the physical uplink shared channel resource in the first subframe greatly reduces time used by the UE to feed back to the first service of the base station and shortens a feedback latency of the first service.

Step S806: The UE receives the first feedback information on a physical downlink control channel resource of the next subframe of the first subframe.

Optionally, a feedback resource location in the eighth embodiment is designed for an uplink synchronous HARQ mechanism. For an uplink asynchronous HARQ mechanism, a determined feedback subframe location is a subframe location determined according to scheduling by the base station after the base station receives the first service.

That is, for a process in which the base station feeds back to the UE in the uplink asynchronous HARQ mechanism is basically similar to that in the eighth embodiment. The only difference lies in that the base station may determine a subframe feedback location according to the first time-frequency resource and a first mapping relationship, but the base station may choose not to perform feedback at the location according to an actual situation of the base station, and choose to send the first feedback information at another location.

According to the service feedback method provided in this embodiment of the present invention, the second communications device sends the first service to the first communications device on the first time-frequency resource, so that the first communications device has sufficient time to process the first service after receiving the first service. The time-frequency resource in the first subframe is re-allocated and the first communications device may send the first feedback information to the second communications device at the preset feedback subframe location, so as to ensure that a latency (that is, the first timing) between sending the first service and receiving the first feedback information corresponding to the first service is less than a latency (that is, the second timing) between sending the second service and receiving the second feedback information corresponding to the second service, that is, less than a feedback latency of a conventional service. Therefore, according to the service feedback method provided in the embodiments of the present invention, a period from sending data to feedback of a low-latency service is shortened and a low latency requirement of the low-latency service is met.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Figure 26:
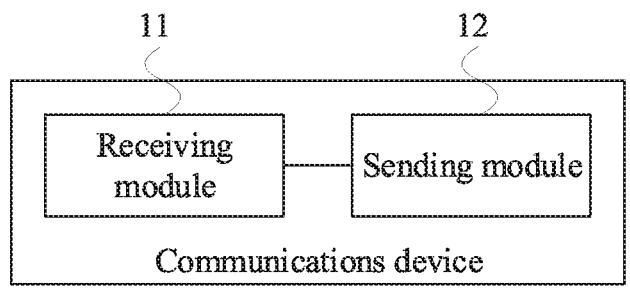
FIG. 26 is a schematic diagram of a structure of a communications device according to a first embodiment of the present invention.

FIG. 26 is a schematic diagram of a structure of a communications device according to a first embodiment of the present invention. The communications device may be the first communications device in the foregoing method embodiment, and the communications device may be a base station or UE. As shown in FIG. 26, the communications device includes a receiving module 11 and a sending module 12.

The receiving module 11 is configured to receive a first service sent by a second communications device on a first time-frequency resource in a first subframe. The first time-frequency resource includes at least one of a physical control channel resource in the first subframe, a physical shared channel resource in the first subframe, or a feedback resource.

The sending module 12 is configured to send, at a preset feedback subframe location, first feedback information corresponding to the first service. An interval between a subframe location corresponding to the first time-frequency resource in the first subframe and the feedback subframe location is first timing. An interval between a subframe location corresponding to a second time-frequency resource used by the second communications device to send a second service and a subframe location corresponding to a third time-frequency resource used by the communications device to send second feedback information to the second communications device is second timing. The first timing is less than the second timing.

Further, the first timing is less than a length of two subframes. The physical control channel resource includes a physical downlink control channel resource and a physical uplink control channel resource in the first subframe. The physical shared channel resource includes a physical downlink shared channel resource and a physical uplink shared channel resource in the first subframe. The feedback resource includes a time-frequency resource that is in the first subframe and used to transmit feedback information.

Figure 27:
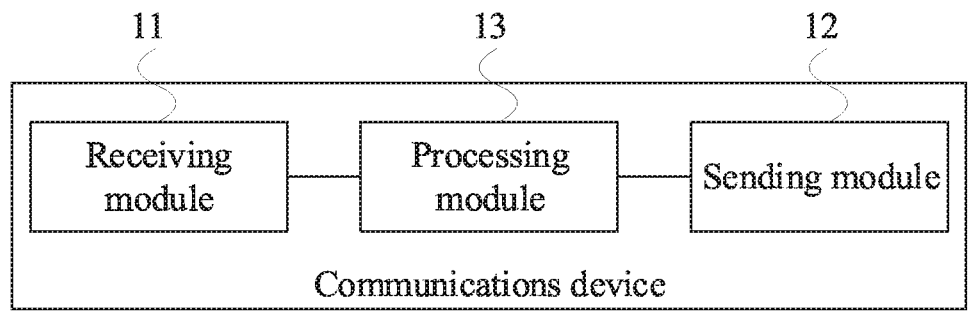
FIG. 27 is a schematic diagram of a structure of a communications device according to a second embodiment of the present invention.

FIG. 27 is a schematic diagram of a structure of a communications device according to a second embodiment of the present invention. On a basis of the embodiment shown in FIG. 26. The communications device further includes: a processing module 13, configured to: before the sending module 12 sends, at the preset feedback subframe location, the first feedback information corresponding to the first service. The processing module 13 is further configured to determine the feedback subframe location according to a type of the first service, a size of the first service, and a first mapping relationship, where the first mapping relationship includes a correspondence between the first time-frequency resource and the first timing.

Optionally, the receiving module 11 is further configured to: before the sending module 12 sends, at the preset feedback subframe location, the first feedback information corresponding to the first service, receive the feedback subframe location that is determined by the second communications device according to a type of the first service, a size of the first service, and a first mapping relationship. The first mapping relationship includes a correspondence between the first time-frequency resource and the first timing.

Optionally, the communications device is user equipment UE, and the second communications device is a base station. The first time-frequency resource is the physical downlink control channel resource in the first subframe, and the second time-frequency resource is the physical downlink shared channel resource in the first subframe; or the first time-frequency resource is a part of the physical downlink shared channel resource, and the second time-frequency resource is a remaining part of the physical downlink shared channel resource; or the first time-frequency resource is a part of the physical downlink control channel resource and a part of the physical downlink shared channel resource, and the second time-frequency resource is a remaining part of the physical downlink shared channel resource.

The receiving module 11 is further configured to: before receiving the first service sent by the second communications device on the first time-frequency resource in the first subframe, receive first indication information sent by the second communications device. The first indication information is used to indicate to the communications device that the first subframe includes the first service. The feedback subframe location is a subframe, in a radio frame, that has an uplink transmission resource and that is closest to the first subframe and that can transmit feedback information.

Optionally, the communications device is user equipment UE, the second communications device is a base station, and the first subframe is a type 1 subframe. The receiving module 11 is further configured to: before receiving the first service sent by the second communications device on the first time-frequency resource in the first subframe, receive second indication information sent by the second communications device. The second indication information is used to indicate to the communications device that the first subframe includes the first service, and to instruct the communications device to receive the first service on a part of a time-frequency resource of the physical downlink shared channel resource. The feedback subframe location is a location, in the first subframe, of the time-frequency resource used to transmit feedback information.

Optionally, the communications device is user equipment UE, the second communications device is a base station, and the first subframe is a type 2 subframe. The first time-frequency resource is a time-frequency resource that is in the first subframe and used to transmit feedback information. The receiving module 11 is further configured to: before receiving the first service sent by the second communications device on the first time-frequency resource in the first subframe, receive third indication information sent by the second communications device. The third indication information is used to indicate to the communications device that the first subframe includes the first service, and to instruct the communications device to receive the first service on the time-frequency resource that is in the first subframe and used to transmit feedback information. The feedback subframe location is a location, in the first subframe, of the physical uplink shared channel resource.

Optionally, the communications device is a base station, and the second communications device is user equipment UE. The first time-frequency resource is the physical uplink control channel resource in the first subframe, and the second time-frequency resource is the physical uplink shared channel resource in the first subframe; or the first time-frequency resource is a part of the physical uplink shared channel resource, and the second time-frequency resource is a remaining part of the physical uplink shared channel resource; or the first time-frequency resource is a part of the physical uplink control channel resource and a part of the physical uplink shared channel resource, and the second time-frequency resource is a remaining part of the physical uplink shared channel resource.

The sending module 12 is further configured to: before the receiving module 11 receives the first service sent by the second communications device on the first time-frequency resource in the first subframe, send fourth indication information to the second communications device. The fourth indication information is used to instruct the second communications device to send the first service on the first time-frequency resource in the first subframe. The feedback subframe location is a subframe that has a downlink transmission resource and that is closest to the first subframe and that can transmit feedback information.

Optionally, the communications device is a base station, and the second communications device is user equipment UE, and the first subframe is a type-1 subframe. The sending module 12 is further configured to: before the receiving module 11 receives the first service sent by the second communications device on the first time-frequency resource in the first subframe, send fifth indication information to the second communications device. The fifth indication information is used to indicate to the second communications device that the first time-frequency resource is a time-frequency resource that is in the first subframe and used to transmit feedback information. The feedback subframe location is a next-next subframe of the first subframe.

Optionally, the communications device is a base station, and the second communications device is user equipment UE, and the first subframe is a type-2 subframe. The sending module 12 is further configured to: before the receiving module 11 receives the first service sent by the second communications device on the first time-frequency resource in the first subframe, send sixth indication information to the second communications device. The sixth indication information is used to indicate to the second communications device that the first time-frequency resource is a part of the physical uplink shared channel resource in the first subframe. The feedback subframe location is a next-next subframe of the first subframe.

Optionally, the communications device is a base station, and the second communications device is user equipment UE, and the first subframe is a type-2 subframe. The sending module 12 is further configured to: before the receiving module 11 receives the first service sent by the second communications device on the first time-frequency resource in the first subframe, send seventh indication information to the second communications device in a previous subframe of the first subframe. The seventh indication information is used to indicate to the second communications device that the first time-frequency resource is a part of the physical uplink shared channel resource in the first subframe. The feedback subframe location is a next subframe of the first subframe.

The communications device provided in this embodiment of the present invention may execute the foregoing method embodiment. Implementation principles and technical effects thereof are similar, and details are not described herein again.

Figure 28:
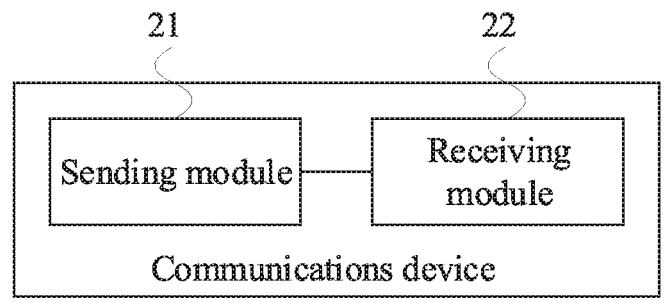
FIG. 28 is a schematic diagram of a structure of a communications device according to a third embodiment of the present invention.

FIG. 28 is a schematic diagram of a structure of a communications device according to a third embodiment of the present invention. The communications device may be the second communications device in the foregoing method embodiment, and the communications device may be a base station or UE. The communications device includes a sending module 21 and a receiving module 22. The sending module 21 is configured to send a first service to a first communications device on a first time-frequency resource in a first subframe. The first time-frequency resource includes at least one of a physical control channel resource in the first subframe, a physical shared channel resource in the first subframe, or a feedback resource.

The receiving module 22 is configured to receive first feedback information that corresponds to the first service and is sent by the first communications device at a preset feedback subframe location. An interval between a subframe location corresponding to the first time-frequency resource in the first subframe and the feedback subframe location is first timing. An interval between a subframe location corresponding to a second time-frequency resource used by the communications device to send a second service and a subframe location corresponding to a third time-frequency resource used by the first communications device to send second feedback information to the communications device is second timing. The first timing is less than the second timing.

Further, the first timing is less than a length of two subframes. The physical control channel resource includes a physical downlink control channel resource and a physical uplink control channel resource in the first subframe. The physical shared channel resource includes a physical downlink shared channel resource and a physical uplink shared channel resource in the first subframe. The feedback resource includes a time-frequency resource that is in the first subframe and used to transmit feedback information.

Figure 29:
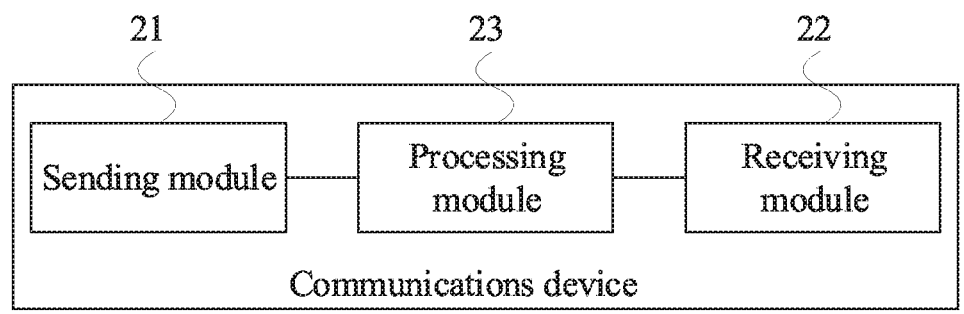
FIG. 29 is a schematic diagram of a structure of a communications device according to a fourth embodiment of the present invention.

FIG. 29 is a schematic diagram of a structure of a communications device according to a fourth embodiment of the present invention. On a basis of the embodiment shown in FIG. 27. The communications device further includes a processing module 23, configured to: before the receiving module 22 receives the first feedback information that corresponds to the first service and is sent by the first communications device at the preset feedback subframe location. The processing module 23 is further configured to: determine the feedback subframe location according to a type of the first service, a size of the first service, and a first mapping relationship, where the first mapping relationship includes a correspondence between the first time-frequency resource and the first timing.

The sending module 21 is configured to send the feedback subframe location to the first communications device, to instruct the first communications device to send the first feedback information at the feedback subframe location.

Optionally, the first communications device is user equipment UE, and the communications device is a base station. The first time-frequency resource is the physical downlink control channel resource in the first subframe, and the second time-frequency resource is the physical downlink shared channel resource in the first subframe; or the first time-frequency resource is a part of the physical downlink shared channel resource, and the second time-frequency resource is a remaining part of the physical downlink shared channel resource; or the first time-frequency resource is a part of the physical downlink control channel resource and a part of the physical downlink shared channel resource, and the second time-frequency resource is a remaining part of the physical downlink shared channel resource.

The sending module 21 is further configured to: before sending the first service to the first communications device on the first time-frequency resource in the first subframe, send first indication information to the first communications device. The first indication information is used to indicate to the first communications device that the first subframe includes the first service. The feedback subframe location is a subframe, in a radio frame, that has an uplink transmission resource and that is closest to the first subframe and that can transmit feedback information.

Optionally, the first communications device is user equipment UE, the communications device is a base station, and the first subframe is a type-1 subframe. The sending module 21 is further configured to: before sending the first service to the first communications device on the first time-frequency resource in the first subframe, send second indication information to the first communications device. The second indication information is used to indicate to the first communications device that the first subframe includes the first service, and to instruct the first communications device to receive the first service on a part of the physical downlink shared channel resource. The feedback subframe location is a location, in the first subframe, of the time-frequency resource used to transmit feedback information.

Optionally, the first communications device is user equipment UE, the communications device is a base station, the first subframe is a type-2 subframe. The first time-frequency resource is a time-frequency resource that is in the first subframe and used to transmit feedback information. The sending module 21 is further configured to: before sending the first service to the first communications device on the first time-frequency resource in the first subframe, send third indication information to the first communications device. The third indication information is used to indicate to the first communications device that the first subframe includes the first service, and to instruct the first communications device to receive the first service on the time-frequency resource that is in the first subframe and used to transmit feedback information. The feedback subframe location is a location, in the first subframe, of the physical uplink shared channel resource.

Optionally, the first communications device is a base station, and the communications device is user equipment UE. The first time-frequency resource is the physical uplink control channel resource in the first subframe, and the second time-frequency resource is the physical uplink shared channel resource in the first subframe; or the first time-frequency resource is a part of the physical uplink shared channel resource, and the second time-frequency resource is a remaining part of the physical uplink shared channel resource; or the first time-frequency resource is a part of the physical uplink control channel resource and a part of the physical uplink shared channel resource, and the second time-frequency resource is a remaining part of the physical uplink shared channel resource.

The receiving module 22 is further configured to: before the sending module 21 sends the first service to the first communications device on the first time-frequency resource in the first subframe, receive fourth indication information sent by the first communications device. The fourth indication information is used to instruct the communications device to send the first service on the first time-frequency resource in the first subframe. The feedback subframe location is a subframe that has a downlink transmission resource and that is closest to the first subframe and that can transmit feedback information.

Optionally, the first communications device is a base station, the communications device is user equipment UE, and the first subframe is a type-1 subframe.

The receiving module 22 is further configured to: before the sending module 21 sends the first service to the first communications device on the first time-frequency resource in the first subframe, receive fifth indication information sent by the first communications device. The fifth indication information is used to indicate to the communications device that the first time-frequency resource is a time-frequency resource that is in the first subframe and used to transmit feedback information. The feedback subframe location is a next-next subframe of the first subframe.

Optionally, the first communications device is a base station, the communications device is user equipment UE, and the first subframe is a type-2 subframe. The receiving module 22 is further configured to: before the sending module 21 sends the first service to the first communications device on the first time-frequency resource in the first subframe, receive sixth indication information sent by the first communications device. The sixth indication information is used to indicate to the communications device that the first time-frequency resource is a part of the physical uplink shared channel resource in the first subframe. The feedback subframe location is a next-next subframe of the first subframe.

Optionally, the first communications device is a base station, the communications device is user equipment UE, and the first subframe is a type-2 subframe. The receiving module 22 is further configured to: before the sending module 21 sends the first service to the first communications device on the first time-frequency resource in the first subframe, receive seventh indication information sent by the first communications device in a previous subframe of the first subframe. The seventh indication information is used to indicate to the communications device that the first time-frequency resource is a part of the physical uplink shared channel resource in the first subframe. The feedback subframe location is a next subframe of the first subframe.

The communications device provided in this embodiment of the present invention may execute the foregoing method embodiment. Implementation principles and technical effects thereof are similar, and details are not described herein again.

Figure 30:
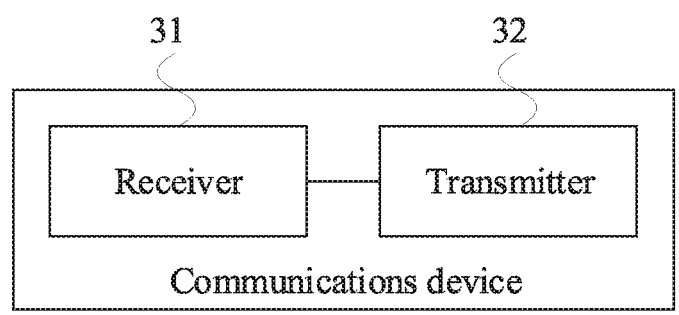
FIG. 30 is a schematic diagram of a structure of a communications device according to a fifth embodiment of the present invention.

FIG. 30 is a schematic diagram of a structure of a communications device according to a fifth embodiment of the present invention. The communications device may be the first communications device in the foregoing method embodiment, and the communications device may be a base station or UE. As shown in FIG. 30, the communications device includes a receiver 31 and a transmitter 32.

The receiver 31 is configured to receive a first service sent by a second communications device on a first time-frequency resource in a first subframe. The first time-frequency resource includes at least one of a physical control channel resource in the first subframe, a physical shared channel resource in the first subframe, or a feedback resource.

The transmitter 32 is configured to send, at a preset feedback subframe location, first feedback information corresponding to the first service. An interval between a subframe location corresponding to the first time-frequency resource in the first subframe and the feedback subframe location is first timing. An interval between a subframe location corresponding to a second time-frequency resource used by the second communications device to send a second service and a subframe location corresponding to a third time-frequency resource used by the communications device to send second feedback information to the second communications device is second timing. The first timing is less than the second timing.

Further, the first timing is less than a length of two subframes. The physical control channel resource includes a physical downlink control channel resource and a physical uplink control channel resource in the first subframe. The physical shared channel resource includes a physical downlink shared channel resource and a physical uplink shared channel resource in the first subframe. The feedback resource includes a time-frequency resource that is in the first subframe and used to transmit feedback information.

Figure 31:
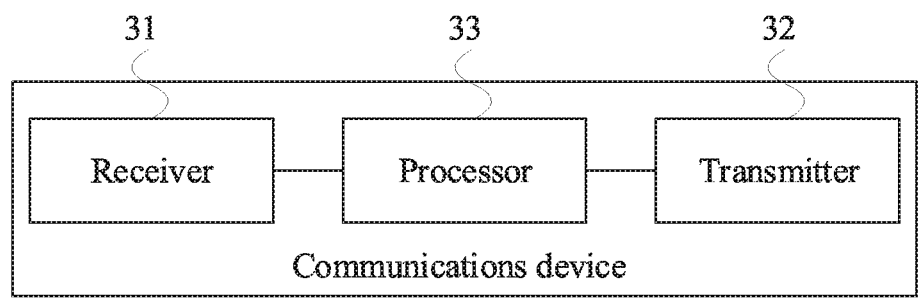
FIG. 31 is a schematic diagram of a structure of a communications device according to a sixth embodiment of the present invention.

FIG. 31 is a schematic diagram of a structure of a communications device according to a sixth embodiment of the present invention. On a basis of the embodiment shown in FIG. 30. The communications device further includes: a processor 33, configured to: before the transmitter 32 sends, at the preset feedback subframe location, the first feedback information corresponding to the first service, determine the feedback subframe location according to a type of the first service, a size of the first service, and a first mapping relationship, where the first mapping relationship includes a correspondence between the first time-frequency resource and the first timing.

Optionally, the receiver 31 is further configured to: before the transmitter 32 sends, at the preset feedback subframe location, the first feedback information corresponding to the first service, receive the feedback subframe location that is determined by the second communications device according to a type of the first service, a size of the first service, and a first mapping relationship. The first mapping relationship includes a correspondence between the first time-frequency resource and the first timing.

Optionally, the communications device is user equipment UE, and the second communications device is a base station. The first time-frequency resource is the physical downlink control channel resource in the first subframe, and the second time-frequency resource is the physical downlink shared channel resource in the first subframe; or the first time-frequency resource is a part of the physical downlink shared channel resource, and the second time-frequency resource is a remaining part of the physical downlink shared channel resource; or the first time-frequency resource is a part of the physical downlink control channel resource and a part of the physical downlink shared channel resource, and the second time-frequency resource is a remaining part of the physical downlink shared channel resource.

The receiver 31 is further configured to: before receiving the first service sent by the second communications device on the first time-frequency resource in the first subframe, receive first indication information sent by the second communications device. The first indication information is used to indicate to the communications device that the first subframe includes the first service. The feedback subframe location is a subframe, in a radio frame, that has an uplink transmission resource and that is closest to the first subframe and that can transmit feedback information.

Optionally, the communications device is user equipment UE, the second communications device is a base station, and the first subframe is a type 1 subframe. The receiver 31 is further configured to: before receiving the first service sent by the second communications device on the first time-frequency resource in the first subframe, receive second indication information sent by the second communications device. The second indication information is used to indicate to the communications device that the first subframe includes the first service, and to instruct the communications device to receive the first service on a part of a time-frequency resource of the physical downlink shared channel resource. The feedback subframe location is a location, in the first subframe, of the time-frequency resource used to transmit feedback information.

Optionally, the communications device is user equipment UE, the second communications device is a base station, and the first subframe is a type 2 subframe. The first time-frequency resource is a time-frequency resource that is in the first subframe and used to transmit feedback information. The receiver 31 is further configured to: before receiving the first service sent by the second communications device on the first time-frequency resource in the first subframe, receive third indication information sent by the second communications device. The third indication information is used to indicate to the communications device that the first subframe includes the first service, and to instruct the communications device to receive the first service on the time-frequency resource that is in the first subframe and used to transmit feedback information. The feedback subframe location is a location, in the first subframe, of the physical uplink shared channel resource.

Optionally, the communications device is a base station, and the second communications device is user equipment UE. The first time-frequency resource is the physical uplink control channel resource in the first subframe, and the second time-frequency resource is the physical uplink shared channel resource in the first subframe; or the first time-frequency resource is a part of the physical uplink shared channel resource, and the second time-frequency resource is a remaining part of the physical uplink shared channel resource; or the first time-frequency resource is a part of the physical uplink control channel resource and a part of the physical uplink shared channel resource, and the second time-frequency resource is a remaining part of the physical uplink shared channel resource.

The transmitter 32 is further configured to: before the receiver 31 receives the first service sent by the second communications device on the first time-frequency resource in the first subframe, send fourth indication information to the second communications device. The fourth indication information is used to instruct the second communications device to send the first service on the first time-frequency resource in the first subframe. The feedback subframe location is a subframe that has a downlink transmission resource and that is closest to the first subframe and that can transmit feedback information.

Optionally, the communications device is a base station, and the second communications device is user equipment UE, and the first subframe is a type-1 subframe. The transmitter 32 is further configured to: before the receiver 31 receives the first service sent by the second communications device on the first time-frequency resource in the first subframe, send fifth indication information to the second communications device. The fifth indication information is used to indicate to the second communications device that the first time-frequency resource is a time-frequency resource that is in the first subframe and used to transmit feedback information. The feedback subframe location is a next-next subframe of the first subframe.

Optionally, the communications device is a base station, and the second communications device is user equipment UE, and the first subframe is a type-2 subframe. The transmitter 32 is further configured to: before the receiver 31 receives the first service sent by the second communications device on the first time-frequency resource in the first subframe, send sixth indication information to the second communications device. The sixth indication information is used to indicate to the second communications device that the first time-frequency resource is a part of the physical uplink shared channel resource in the first subframe. The feedback subframe location is a next-next subframe of the first subframe.

Optionally, the communications device is a base station, and the second communications device is user equipment UE, and the first subframe is a type-2 subframe. The transmitter 32 is further configured to: before the receiver 31 receives the first service sent by the second communications device on the first time-frequency resource in the first subframe, send seventh indication information to the second communications device in a previous subframe of the first subframe. The seventh indication information is used to indicate to the second communications device that the first time-frequency resource is a part of the physical uplink shared channel resource in the first subframe. The feedback subframe location is a next subframe of the first subframe.

The communications device provided in this embodiment of the present invention may execute the foregoing method embodiment. Implementation principles and technical effects thereof are similar, and details are not described herein again.

Figure 32:
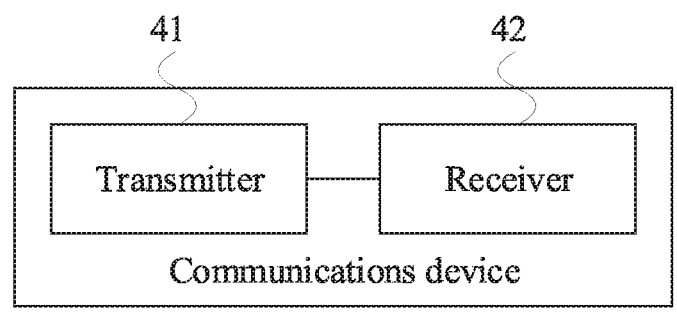
FIG. 32 is a schematic diagram of a structure of a communications device according to a seventh embodiment of the present invention.

FIG. 32 is a schematic diagram of a structure of a communications device according to a seventh embodiment of the present invention. The communications device may be the second communications device in the foregoing method embodiment, and the communications device may be a base station or UE. As shown in FIG. 32, the communications device includes a transmitter 41 and a receiver 42.

The transmitter 41 is configured to send a first service to a first communications device on a first time-frequency resource in a first subframe. The first time-frequency resource includes at least one of a physical control channel resource in the first subframe, a physical shared channel resource in the first subframe, or a feedback resource.

The receiver 42 is configured to receive first feedback information that corresponds to the first service and is sent by the first communications device at a preset feedback subframe location. An interval between a subframe location corresponding to the first time-frequency resource in the first subframe and the feedback subframe location is first timing. An interval between a subframe location corresponding to a second time-frequency resource used by the communications device to send a second service and a subframe location corresponding to a third time-frequency resource used by the first communications device to send second feedback information to the communications device is second timing. The first timing is less than the second timing.

Further, the first timing is less than a length of two subframes. The physical control channel resource includes a physical downlink control channel resource and a physical uplink control channel resource in the first subframe. The physical shared channel resource includes a physical downlink shared channel resource and a physical uplink shared channel resource in the first subframe. The feedback resource includes a time-frequency resource that is in the first subframe and used to transmit feedback information.

Figure 33:
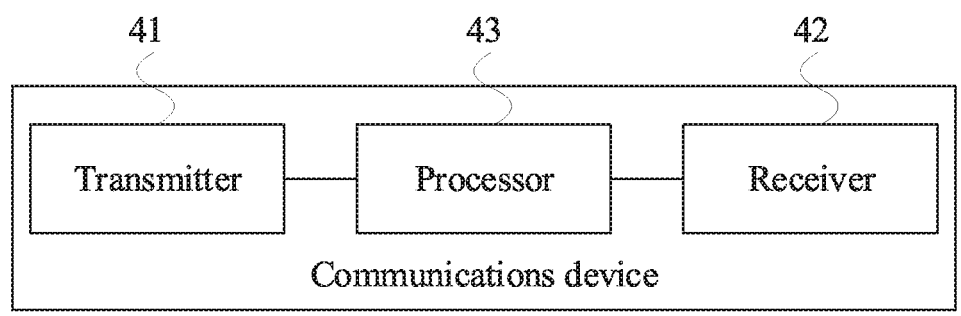
FIG. 33 is a schematic diagram of a structure of a communications device according to an eighth embodiment of the present invention.

FIG. 33 is a schematic diagram of a structure of a communications device according to an eighth embodiment of the present invention. On a basis of the embodiment shown in FIG. 32. The communications device further includes a processor 43, configured to: before the receiver 42 receives the first feedback information that corresponds to the first service and is sent by the first communications device at the preset feedback subframe location. The processor 43 is further configured to: determine the feedback subframe location according to a type of the first service, a size of the first service, and a first mapping relationship, where the first mapping relationship includes a correspondence between the first time-frequency resource and the first timing.

The transmitter 41 is configured to send the feedback subframe location to the first communications device, to instruct the first communications device to send the first feedback information at the feedback subframe location.

Optionally, the first communications device is user equipment UE, and the communications device is a base station. The first time-frequency resource is the physical downlink control channel resource in the first subframe, and the second time-frequency resource is the physical downlink shared channel resource in the first subframe; or the first time-frequency resource is a part of the physical downlink shared channel resource, and the second time-frequency resource is a remaining part of the physical downlink shared channel resource; or the first time-frequency resource is a part of the physical downlink control channel resource and a part of the physical downlink shared channel resource, and the second time-frequency resource is a remaining part of the physical downlink shared channel resource.

The transmitter 41 is further configured to: before sending the first service to the first communications device on the first time-frequency resource in the first subframe, send first indication information to the first communications device. The first indication information is used to indicate to the first communications device that the first subframe includes the first service. The feedback subframe location is a subframe, in a radio frame, that has an uplink transmission resource and that is closest to the first subframe and that can transmit feedback information.

Optionally, the first communications device is user equipment UE, the communications device is a base station, and the first subframe is a type-1 subframe. The transmitter 41 is further configured to: before sending the first service to the first communications device on the first time-frequency resource in the first subframe, send second indication information to the first communications device. The second indication information is used to indicate to the first communications device that the first subframe includes the first service, and to instruct the first communications device to receive the first service on a part of the physical downlink shared channel resource. The feedback subframe location is a location, in the first subframe, of the time-frequency resource used to transmit feedback information.

Optionally, the first communications device is user equipment UE, the communications device is a base station, the first subframe is a type-2 subframe. The first time-frequency resource is a time-frequency resource that is in the first subframe and used to transmit feedback information. The transmitter 41 is further configured to: before sending the first service to the first communications device on the first time-frequency resource in the first subframe, send third indication information to the first communications device. The third indication information is used to indicate to the first communications device that the first subframe includes the first service, and to instruct the first communications device to receive the first service on the time-frequency resource that is in the first subframe and used to transmit feedback information. The feedback subframe location is a location, in the first subframe, of the physical uplink shared channel resource.

Optionally, the first communications device is a base station, and the communications device is user equipment UE. The first time-frequency resource is the physical uplink control channel resource in the first subframe, and the second time-frequency resource is the physical uplink shared channel resource in the first subframe; or the first time-frequency resource is a part of the physical uplink shared channel resource, and the second time-frequency resource is a remaining part of the physical uplink shared channel resource; or the first time-frequency resource is a part of the physical uplink control channel resource and a part of the physical uplink shared channel resource, and the second time-frequency resource is a remaining part of the physical uplink shared channel resource.

The receiver 42 is further configured to: before the transmitter 41 sends the first service to the first communications device on the first time-frequency resource in the first subframe, receive fourth indication information sent by the first communications device. The fourth indication information is used to instruct the communications device to send the first service on the first time-frequency resource in the first subframe. The feedback subframe location is a subframe that has a downlink transmission resource and that is closest to the first subframe and that can transmit feedback information.

Optionally, the first communications device is a base station, the communications device is user equipment UE, and the first subframe is a type-1 subframe. The receiver 42 is further configured to: before the transmitter 41 sends the first service to the first communications device on the first time-frequency resource in the first subframe, receive fifth indication information sent by the first communications device. The fifth indication information is used to indicate to the communications device that the first time-frequency resource is a time-frequency resource that is in the first subframe and used to transmit feedback information. The feedback subframe location is a next-next subframe of the first subframe.

Optionally, the first communications device is a base station, the communications device is user equipment UE, and the first subframe is a type-2 subframe. The receiver 42 is further configured to: before the transmitter 41 sends the first service to the first communications device on the first time-frequency resource in the first subframe, receive sixth indication information sent by the first communications device. The sixth indication information is used to indicate to the communications device that the first time-frequency resource is a part of the physical uplink shared channel resource in the first subframe. The feedback subframe location is a next-next subframe of the first subframe.

Optionally, the first communications device is a base station, the communications device is user equipment UE, and the first subframe is a type-2 subframe. The receiver 42 is further configured to: before the transmitter 41 sends the first service to the first communications device on the first time-frequency resource in the first subframe, receive seventh indication information sent by the first communications device in a previous subframe of the first subframe. The seventh indication information is used to indicate to the communications device that the first time-frequency resource is a part of the physical uplink shared channel resource in the first subframe. The feedback subframe location is a next subframe of the first subframe.

The communications device provided in this embodiment of the present invention may execute the foregoing method embodiment. Implementation principles and technical effects thereof are similar, and details are not described herein again.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention

What is claimed is:

1. A method, comprising:
    receiving, by a first communications device from a second communications device, a first service of a first type on a first time-frequency resource in a first subframe, wherein the first time-frequency resource comprises a physical control channel resource in the first subframe, a physical shared channel resource in the first subframe, or a feedback resource;
    receiving, by the first communications device from the second communications device after receiving the first service, a second service of a second type on a second time-frequency resource in the first subframe;
    sending, by the first communications device to the second communications device, at a preset feedback subframe location configured for the first type, first feedback information corresponding to the first service, wherein an interval between the first subframe and a feedback subframe corresponding to the preset feedback subframe location is first timing for feedback; and
    sending, by the first communications device to the second communications device, second feedback information corresponding to the second service on a third time-frequency resource, wherein an interval between the first subframe and a subframe corresponding to the third time-frequency resource is second timing for feedback, and the first timing is less than the second timing.

2. The method according to claim 1, wherein the first timing is less than a length of two subframes.

3. The method according to claim 1, wherein the physical control channel resource comprises a physical downlink control channel resource or a physical uplink control channel resource in the first subframe, wherein the physical shared channel resource comprises a physical downlink shared channel resource or a physical uplink shared channel resource in the first subframe, and wherein the feedback resource comprises a time-frequency resource in the first subframe for transmitting feedback information.

4. The method according to claim 1, wherein before sending, at the preset feedback subframe location, the first feedback information corresponding to the first service, the method further comprises:
determining the preset feedback subframe location according to a type of the first service, a size of the first service, and a first mapping relationship, wherein the first mapping relationship comprises a correspondence between the first time-frequency resource and the first timing.

5. The method according to claim 1, wherein before receiving the first service sent by the second communications device on the first time-frequency resource in the first subframe, the method further comprises:
receiving first indication information sent by the second communications device, wherein the first indication information indicates to the first communications device that the first subframe comprises the first service, wherein the first communications device is user equipment and the second communications device is a base station, and wherein:
the first time-frequency resource is a physical downlink control channel resource in the first subframe, and the second time-frequency resource is a physical downlink shared channel resource in the first subframe;
the first time-frequency resource is a part of the physical downlink shared channel resource, and the second time-frequency resource is a remaining part of the physical downlink shared channel resource; or
the first time-frequency resource is a part of the physical downlink control channel resource and a part of the physical downlink shared channel resource, and the second time-frequency resource is a remaining part of the physical downlink shared channel resource.

6. The method according to claim 1, wherein the first communications device is user equipment, the second communications device is a base station, and the first subframe is a type-1 subframe, and wherein before receiving the first service sent by the second communications device on the first time-frequency resource in the first subframe, the method further comprises:
receiving second indication information sent by the second communications device, wherein the second indication information indicates to the first communications device that the first subframe comprises the first service, and the second indication information further instructs the first communications device to receive the first service on a part of a physical downlink shared channel resource.

7. The method according to claim 6, wherein the preset feedback subframe location is a location, in the first subframe, of a time-frequency resource used to transmit feedback information.

8. The method according to claim 1, wherein the first communications device is user equipment, the second communications device is a base station, the first subframe is a type-2 subframe, and the first time-frequency resource is a time-frequency resource in the first subframe for transmitting feedback information, and wherein before receiving the first service sent by the second communications device on the first time-frequency resource in the first subframe, the method further comprises:
receiving third indication information sent by the second communications device, wherein the third indication information indicates to the first communications device that the first subframe comprises the first service, and wherein the third indication information further instructs the first communications device to receive the first service on the first time-frequency resource that is in the first subframe and used to transmit feedback information.

9. The method according to claim 8, wherein the preset feedback subframe location is a location, in the first subframe, of a physical uplink shared channel resource.

10. The method according to claim 1, wherein the first communications device is a base station, the second communications device is user equipment, and the first subframe is a type-1 subframe, and wherein before receiving the first service sent by the second communications device on the first time-frequency resource in the first subframe, the method further comprises:
sending fifth indication information to the second communications device, wherein the fifth indication information indicates to the second communications device that the first time-frequency resource is a time-frequency resource in the first subframe and transmits feedback information.

11. An apparatus, comprising:
a non-transitory computer storage medium including executable instructions; and
a processor;
wherein the executable instructions, when executed by the processor, cause the apparatus to:
receive, from a second communications device, a first service of a first type on a first time-frequency resource in a first subframe, wherein the first time-frequency resource comprises a physical control channel resource in the first subframe, a physical shared channel resource in the first subframe, or a feedback resource;
receive, from the second communications device after receiving the first service, a second service of a second type on a second time-frequency resource in the first subframe;
send, at a preset feedback subframe location configured for the first type, first feedback information corresponding to the first service, wherein an interval between the first subframe and a feedback subframe corresponding to the preset feedback subframe location is first timing for feedback; and
send second feedback information corresponding to the second service on a third time-frequency resource, wherein an interval between the first subframe and a subframe corresponding to the third time-frequency resource is second timing for feedback, and the first timing is less than the second timing.

12. The apparatus according to claim 11, wherein the first timing is less than a length of two subframes.

13. The apparatus according to claim 11, wherein the physical control channel resource comprises a physical downlink control channel resource or a physical uplink control channel resource in the first subframe; the physical shared channel resource comprises a physical downlink shared channel resource or a physical uplink shared channel resource in the first subframe; and the feedback resource comprises a time-frequency resource that is in the first subframe and used to transmit feedback information.

14. The apparatus according to claim 11, wherein the executable instructions, when executed by the processor, further cause the apparatus to:

determine the preset feedback subframe location according to a type of the first service, a size of the first service, and a first mapping relationship, wherein the first mapping relationship comprises a correspondence between the first time-frequency resource and the first timing.

15. The apparatus according to claim 11, wherein the executable instructions, when executed by the processor, further cause the apparatus to:

receive first indication information sent by the second communications device, wherein the first indication information indicates to the apparatus that the first subframe comprises the first service, wherein the apparatus is user equipment, and the second communications device is a base station, and wherein:

the first time-frequency resource is a physical downlink control channel resource in the first subframe, and the second time-frequency resource is a physical downlink shared channel resource in the first subframe;

the first time-frequency resource is a part of the physical downlink shared channel resource, and the second time-frequency resource is a remaining part of the physical downlink shared channel resource; or the first time-frequency resource is a part of the physical downlink control channel resource and a part of the physical downlink shared channel resource, and the second time-frequency resource is a remaining part of the physical downlink shared channel resource.

16. The apparatus according to claim 15, wherein the apparatus is user equipment, the second communications device is a base station, and the first subframe is a type-1 subframe;

wherein the executable instructions, when executed by the processor, further cause the apparatus to:

receive second indication information sent by the second communications device, wherein the second indication information indicates to the apparatus that the first subframe comprises the first service, and wherein the second indication information instructs the apparatus to receive the first service on a part of the physical downlink shared channel resource.

17. The apparatus according to claim 16, wherein the preset feedback subframe location is a location, in the first subframe, of a time-frequency resource used to transmit feedback information.

18. The apparatus according to claim 11, wherein the apparatus is user equipment, the second communications device is a base station, the first subframe is a type-2 subframe, and the first time-frequency resource is a time-frequency resource in the first subframe for transmitting feedback information;

wherein the executable instructions, when executed by the processor, further cause the apparatus to:

before receiving the first service sent by the second communications device on the first time-frequency resource in the first subframe, receive third indication information sent by the second communications device, wherein the third indication information indicates to the apparatus that the first subframe comprises the first service, and instructs the apparatus to receive the first service on the first time-frequency resource in the first subframe and used to transmit feedback information.

19. The apparatus according to claim 11, wherein the apparatus is a base station, the second communications device is user equipment, and the first subframe is a type-1 subframe;

wherein the executable instructions, when executed by the processor, further cause the apparatus to:

before receiving the first service sent by the second communications device on the first time-frequency resource in the first subframe, send fifth indication information to the second communications device, wherein the fifth indication information indicates to the second communications device that the first time-frequency resource is a time-frequency resource in the first subframe and transmits feedback information.

20. A non-transitory computer-readable storage medium comprising instructions which, when executed by a computer of a first communications device, cause the computer to:

receive, from a second communications device, a first service of a first type on a first time-frequency resource in a first subframe, wherein the first time-frequency resource comprises a physical control channel resource in the first subframe, a physical shared channel resource in the first subframe, or a feedback resource;

receive, from the second communications device after receiving the first service, a second service of a second type on a second time-frequency resource in the first subframe;

send, at a preset feedback subframe location configured for the first type, first feedback information corresponding to the first service, wherein an interval between the first subframe and a feedback subframe corresponding to the preset feedback subframe location is first timing for feedback; and send second feedback information corresponding to the second service on a third time-frequency resource, wherein an interval between the first subframe and a subframe corresponding to the third time-frequency resource is second timing for feedback, and the first timing is less than the second timing.

* * * * *